United States Patent
Krah et al.

(10) Patent No.: US 10,042,459 B2
(45) Date of Patent: *Aug. 7, 2018

(54) DYNAMIC VOLTAGE GENERATION FOR TOUCH-ENABLED DISPLAYS

(71) Applicant: Apple Inc., Cupertino, CA (US)

(72) Inventors: Christoph H. Krah, Los Altos, CA (US); Yafei Bi, Palo Alto, CA (US); Kevin J. White, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/847,404

(22) Filed: Sep. 8, 2015

(65) Prior Publication Data
US 2016/0224172 A1    Aug. 4, 2016

Related U.S. Application Data

(63) Continuation of application No. 13/563,412, filed on Jul. 31, 2012, now Pat. No. 9,164,606.
(Continued)

(51) Int. Cl.
*G06F 3/041* (2006.01)
*G06F 3/044* (2006.01)

(52) U.S. Cl.
CPC .......... *G06F 3/0416* (2013.01); *G06F 3/041* (2013.01); *G06F 3/044* (2013.01); *G06F 3/0412* (2013.01)

(58) Field of Classification Search
CPC ........ G06F 3/0416; G06F 3/041; G06F 3/044; G06F 3/0412
See application file for complete search history.

(56) References Cited

U.S. PATENT DOCUMENTS 5,483,261 A    1/1996    Yasutake
5,488,204 A    1/1996    Mead et al.
(Continued)

FOREIGN PATENT DOCUMENTS

| GB | 2469374 A | 10/2010 |
|---|---|---|
| JP | 2000-163031 A | 6/2000 |
| JP | 2002-342033 A | 11/2002 |

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.
(Continued)

*Primary Examiner* — Kenneth Bukowski
(74) *Attorney, Agent, or Firm* — Morrison and Foerster LLP

(57) ABSTRACT

The disclosed embodiments relate to a system that provides power for a touch-enabled display, wherein the touch-enabled display cycles between a display mode and a touch mode. During the display mode, the system drives a display-mode voltage to the touch-enabled display through a power output, wherein the power output is coupled through a display-mode capacitor $C_D$ to ground. Next, during a transition from the display mode to the touch mode, the system couples the power output through a touch-mode capacitor $C_T$ to ground, wherein $C_T$ was previously charged to a touch-mode voltage, which causes the power output to rapidly transition to the touch-mode voltage. Then, during the touch mode, the system drives the touch-mode voltage through the power output.

32 Claims, 18 Drawing Sheets

Related U.S. Application Data

(60) Provisional application No. 61/657,426, filed on Jun. 8, 2012.

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,880,411 A | 3/1999 | Gillespie et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,663,607 B2 | 2/2010 | Hotelling et al. | |
| 8,479,122 B2 | 7/2013 | Hotelling et al. | |
| 8,749,511 B2* | 6/2014 | Wang | G02F 1/13338 345/174 |
| 9,760,195 B2* | 9/2017 | Krah | G06F 3/0412 |
| 2005/0200586 A1* | 9/2005 | Kojima | G09G 3/3666 345/96 |
| 2006/0197753 A1 | 9/2006 | Hotelling | |
| 2007/0216657 A1* | 9/2007 | Konicek | G06F 3/0412 345/173 |
| 2008/0309627 A1* | 12/2008 | Hotelling | G02F 1/134363 345/173 |
| 2009/0195295 A1 | 8/2009 | Uematsu | |
| 2010/0053112 A1* | 3/2010 | Chen | G02F 1/13338 345/174 |
| 2010/0194698 A1* | 8/2010 | Hotelling | G06F 1/3218 345/173 |
| 2010/0194707 A1* | 8/2010 | Hotelling | G06F 3/0412 345/173 |
| 2010/0253638 A1 | 10/2010 | Yousefpor | |
| 2012/0154322 A1* | 6/2012 | Yang | G06F 3/0412 345/174 |
| 2014/0292711 A1* | 10/2014 | Teranishi | G09G 3/3696 345/174 |
| 2015/0355743 A1* | 12/2015 | Hu | G06F 3/0412 345/175 |
| 2016/0202815 A1* | 7/2016 | Zheng | G06F 3/044 345/174 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

* cited by examiner

DYNAMIC VOLTAGE GENERATION FOR TOUCH-ENABLED DISPLAYS

CROSS-REFERENCE TO RELATED APPLICATIONS

This application is a continuation application of U.S. Non-provisional application Ser. No. 13/563,412, filed Jul. 31, 2012, which claims the benefit of U.S. Provisional Application No. 61/657,426, filed Jun. 8, 2012, the entire contents of the chain of applications is incorporated by reference herein in its entirety.

BACKGROUND

The disclosed embodiments generally relate to the design of touch screens for computing devices. More specifically, the disclosed embodiments relate to the design of a power management system that provides power for a touch-enabled display.

Many types of input devices are presently used in computing systems, such as buttons or keys, mice, trackballs, joysticks, touch sensor panels, touch screens and the like. Touch screens, in particular, are becoming increasingly popular because of their ease and versatility of operation as well as their declining price. Touch screens can include a touch sensor panel, which can be a clear panel with a touch-sensitive surface, and a display device such as a liquid crystal display (LCD) that can be positioned partially or fully behind the panel so that the touch-sensitive surface can cover at least a portion of the viewable area of the display device. Touch screens allow a user to perform various functions by touching the touch sensor panel using a finger, stylus or other object at a location dictated by a user interface (UI) being displayed by the display device. In general, touch screens can recognize a touch and the position of the touch on the touch sensor panel, and the computing system can then interpret the touch in accordance with the display appearing at the time of the touch, and can perform one or more actions based on the touch.

One challenge in designing touch screens is that the circuitry which displays images generally operates at a different voltage than the significantly more-sensitive circuitry that senses the touches. To deal with this problem, touch-enabled displays typically cycle between a "display mode," wherein the system operates at a corresponding display-mode voltage, and a "touch mode" wherein the system operates at a touch-mode voltage. However, it is challenging to design a power delivery system that can switch between these voltage levels quickly and efficiently.

SUMMARY

The disclosed embodiments relate to a system that provides power for a touch-enabled display, wherein the touch-enabled display cycles between a display mode and a touch mode. During the display mode, the system drives a display-mode voltage to the touch-enabled display through a power output, wherein the power output is coupled through a display-mode capacitor CD to ground. Next, during a transition from the display mode to the touch mode, the system couples the power output through a touch-mode capacitor CT to ground, wherein CT was previously charged to a touch-mode voltage and consequently causes the power output to rapidly transition to the touch-mode voltage. Then, during the touch mode, the system drives the touch-mode voltage through the power output.

In some embodiments, during a transition between the touch mode and the display mode, the system uncouples $C_T$ from between the power output and ground.

In a variation in these embodiments, during the touch mode, the system uses an auxiliary power source to charge the uncoupled touch-mode capacitor CT to the touch-mode voltage.

In some embodiments, during the touch mode, CT is coupled in parallel with CD between the power output and ground. In these embodiments, the capacitance on CT is larger than the capacitance on CD, so that CT dominates CD during the touch mode.

In some embodiments, during the transition between the display mode and the touch mode, $C_D$ is uncoupled from between the power output and ground.

In some embodiments, the power output is a low output which provides a low display-mode voltage during the display mode and a low touch-mode voltage during the touch mode. Moreover, this low output is associated with a high output which provides a high display-mode voltage during the display mode and a high touch-mode voltage during the touch mode.

In some embodiments, during the display mode, the system drives a high display-mode voltage to the touch-enabled display through the high output, wherein the high output is coupled through a high-voltage display-mode capacitor $C_{HD}$ to ground. Next, during the transition from the display mode to the touch mode, the system couples the high output through a high-voltage touch-mode capacitor $C_{HT}$ to ground, wherein $C_{HT}$ was previously charged to a high touch-mode voltage, thereby causing the high output to rapidly transition to the high touch-mode voltage. Next, during the touch mode, the system drives the high touch-mode voltage through the high output.

In some embodiments, driving the display-mode and touch-mode voltages through the power output involves using a charge pump to drive the display-mode and touch-mode voltages.

DETAILED DESCRIPTION

The following description is presented to enable any person skilled in the art to make and use the disclosed embodiments, and is provided in the context of a particular application and its requirements. Various modifications to the disclosed embodiments will be readily apparent to those skilled in the art, and the general principles defined herein may be applied to other embodiments and applications without departing from the spirit and scope of the disclosed embodiments. Thus, the disclosed embodiments are not limited to the embodiments shown, but are to be accorded the widest scope consistent with the principles and features disclosed herein.

The data structures and code described in this detailed description are typically stored on a non-transitory computer-readable storage medium, which may be any device or medium that can store code and/or data for use by a computer system. The non-transitory computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a non-transitory computer-readable storage medium as described above. When a computer system reads and executes the code and/or data stored on the non-transitory computer-readable storage medium, the computer system performs the methods and processes embodied as data structures and code and stored within the non-transitory computer-readable storage medium. Furthermore, the methods and processes described below can be included in hardware modules. For example, the hardware modules can include, but are not limited to, application-specific integrated circuit (ASIC) chips, field-programmable gate arrays (FPGAs), and other programmable-logic devices now known or later developed. When the hardware modules are activated, the hardware modules perform the methods and processes included within the hardware modules.

Figure 1C:
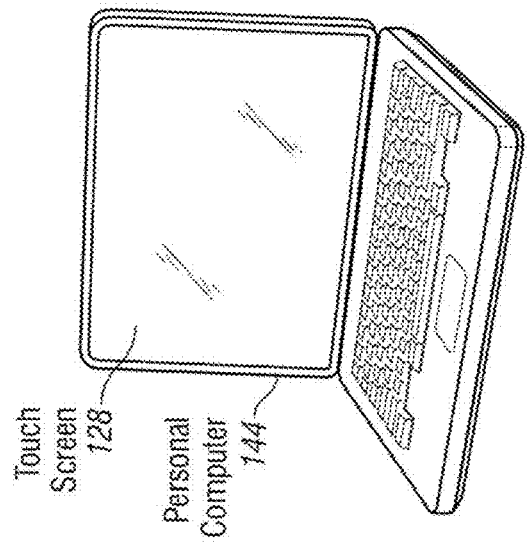
FIGS. 1A-1C illustrate an exemplary mobile telephone, an exemplary media player, and an exemplary personal computer that each include an exemplary touch screen according to embodiments of the disclosure.
Figure 1B:
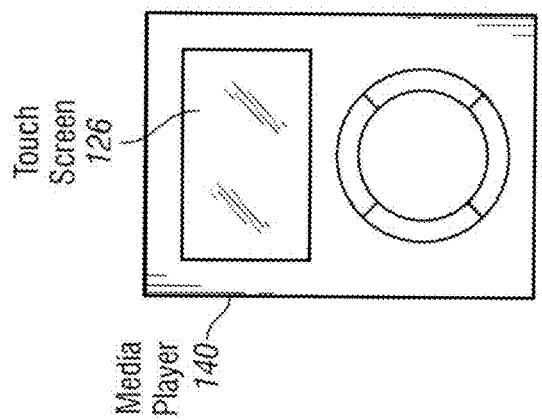
Figure 1A:
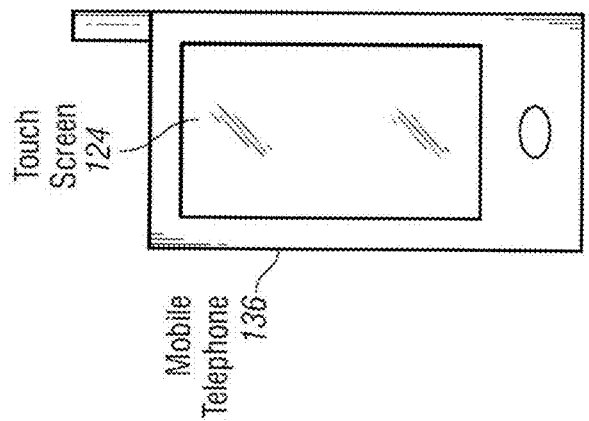

FIGS. 1A-1C show exemplary systems in which a touch screen according to embodiments of the disclosure may be implemented. FIG. 1A illustrates an exemplary mobile telephone 136 that includes a touch screen 124. FIG. 113 illustrates an exemplary digital media player 140 that includes a touch screen 126. FIG. 1C illustrates an exemplary personal computer 144 that includes a touch screen 128. Although not shown in the figures, the personal computer 144 can also be a tablet computer or a desktop computer with a touch-sensitive display. Touch screens 124, 126, and 128 may be based on, for example, self-capacitance or mutual capacitance, or another touch sensing technology. For example, in a self-capacitance based touch system, an individual electrode with a self-capacitance to ground can be used to form a touch pixel for detecting touch. As an object approaches the touch pixel, an additional capacitance to ground can be formed between the object and the touch pixel. The additional capacitance to ground can result in a net increase in the self-capacitance seen by the touch pixel. This increase in self-capacitance can be detected and measured by a touch sensing system to determine the positions of multiple objects when they touch the touch screen.

A mutual capacitance based touch system can include, for example, drive regions and sense regions, such as drive lines and sense lines. For example, drive lines can be formed in rows while sense lines can be formed in columns (e.g., orthogonal). Touch pixels can be formed at the intersections of the rows and columns. During operation, the rows can be stimulated with an AC waveform and a mutual capacitance can be formed between the row and the column of the touch pixel. As an object approaches the touch pixel, some of the charge being coupled between the row and column of the touch pixel can instead be coupled onto the object. This reduction in charge coupling across the touch pixel can result in a net decrease in the mutual capacitance between the row and the column and a reduction in the AC waveform being coupled across the touch pixel.

This reduction in the charge-coupled AC waveform can be detected and measured by the touch sensing system to determine the positions of multiple objects when they touch the touch screen. In some embodiments, a touch screen can be multi-touch, single touch, projection scan, full-imaging multi-touch, or any capacitive touch.

Figure 2:
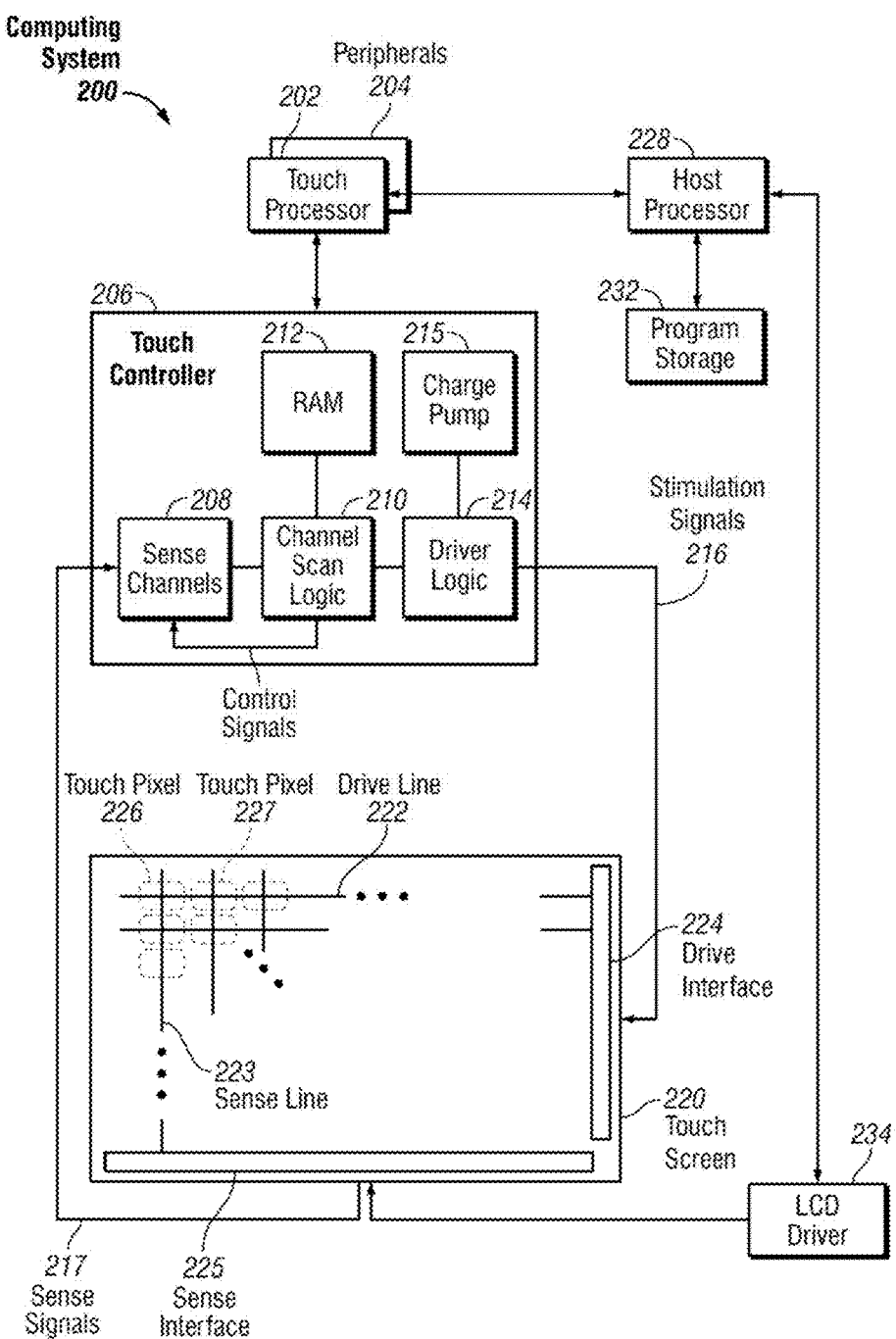
FIG. 2 presents a block diagram of an exemplary computing system that illustrates one implementation of an exemplary touch screen according to embodiments of the disclosure.

FIG. 2 is a block diagram of an exemplary computing system 200 that illustrates one implementation of an exemplary touch screen 220 according to embodiments of the disclosure. Computing system 200 could be included in, for example, mobile telephone 136, digital media player 140, personal computer 144, or any mobile or non-mobile computing device that includes a touch screen. Computing system 200 can include a touch sensing system including one or more touch processors 202, peripherals 204, a touch controller 206, and touch sensing circuitry (described in more detail below). Peripherals 204 can include, but are not limited to, random access memory (RAM) or other types of memory or storage, watchdog timers and the like. Touch controller 206 can include, but is not limited to, one or more sense channels 208, channel scan logic 210 and driver logic 214. Channel scan logic 210 can access RAM 212, autonomously read data from the sense channels and provide control for the sense channels. In addition, channel scan logic 210 can control driver logic 214 to generate stimulation signals 216 at various frequencies and phases that can be selectively applied to drive regions of the touch sensing circuitry of touch screen 220, as described in more detail below. In some embodiments, touch controller 206, touch processor 202 and peripherals 204 can be integrated into a single application-specific integrated circuit (ASIC).

Computing system 200 can also include a host processor 228 for receiving outputs from touch processor 202 and performing actions based on the outputs. For example, host processor 228 can be connected to program storage 232 and a display controller, such as an LCD driver 234. Host processor 228 can use LCD driver 234 to generate an image on touch screen 220, such as an image of a user interface (UI), and can use touch processor 202 and touch controller 206 to detect a touch on or near touch screen 220, such a touch input to the displayed UI. The touch input can be used by computer programs stored in program storage 232 to perform actions that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or other audio settings, storing information related to telephone communications (such as addresses, frequently dialed numbers, received calls, missed calls), logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 228 can also perform additional functions that may not be related to touch processing.

Touch screen 220 can include touch sensing circuitry that can include a capacitive sensing medium having a plurality of drive lines 222 and a plurality of sense lines 223. It should be noted that the term "lines" is sometimes used herein to mean, simply, conductive pathways, as one skilled in the art will readily understand, and is not limited to elements that are strictly linear, but includes pathways that change direction, and includes pathways of different size, shape, materials, etc. Drive lines 222 can be driven by stimulation signals 216 from driver logic 214 through a drive interface 224, and resulting sense signals 217 generated in sense lines 223 can be transmitted through a sense interface 225 to sense channels 208 (also referred to as an event detection and demodulation circuit) in touch controller 206. In this way, drive lines and sense lines can be part of the touch sensing circuitry that can interact to form capacitive sensing nodes, which can be thought of as touch picture elements (touch pixels), such as touch pixels 226 and 227. This way of understanding can be particularly useful when touch screen 220 is viewed as capturing an "image" of touch. In other words, after touch controller 206 has determined whether a touch has been detected at each touch pixel in the touch screen, the pattern of touch pixels in the touch screen at which a touch occurred can be thought of as an "image" of touch (e.g. a pattern of fingers touching the touch screen).

Figure 3:
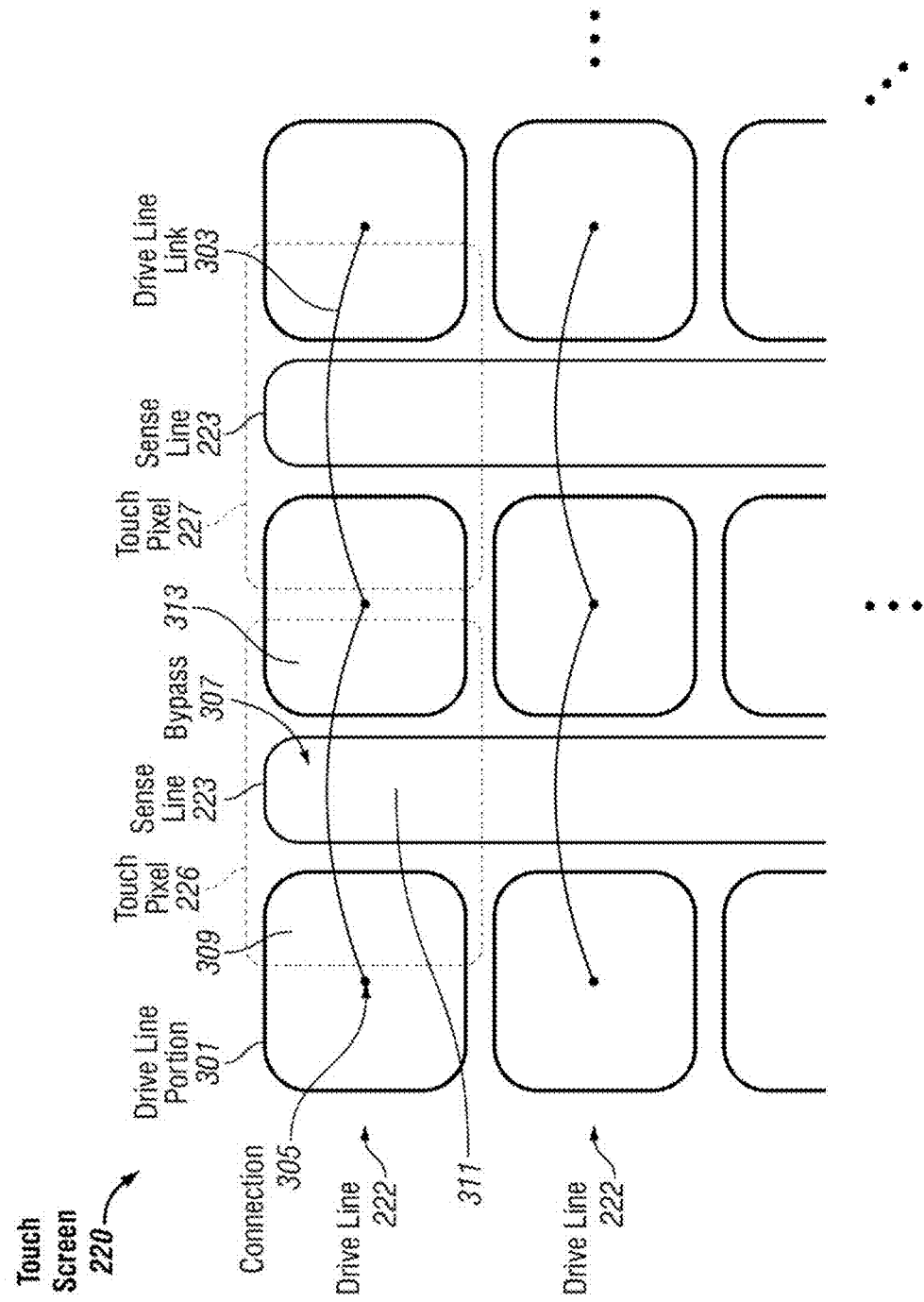
FIG. 3 provides a more-detailed view of the touch screen of FIG. 2 showing an exemplary configuration of drive lines and sense lines according to embodiments of the disclosure.

In some exemplary embodiments, touch screen 220 can be an integrated touch screen in which touch sensing circuit elements of the touch sensing system can be integrated into the display pixel stackups of a display. An exemplary integrated touch screen in which embodiments of the disclosure can be implemented will now be described with reference to FIGS. 3-6. FIG. 3 is a more detailed view of touch screen 220 showing an exemplary configuration of drive lines 222 and sense lines 223 according to embodiments of the disclosure.

Figure 4:
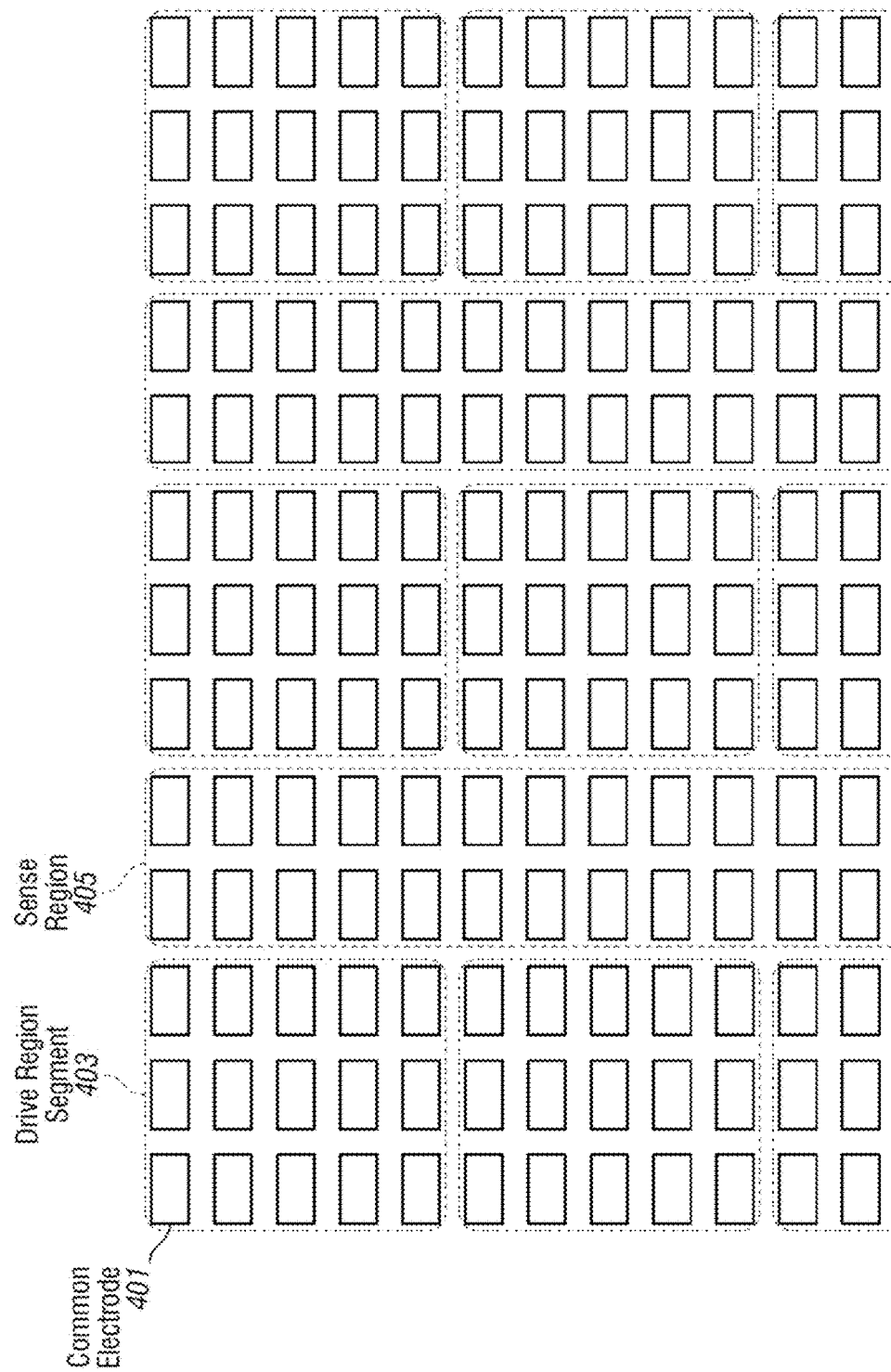
FIG. 4 illustrates an exemplary configuration in which touch sensing circuitry includes common electrodes (Vcom) according to embodiments of the disclosure.

As shown in FIG. 3, each drive line 222 can be formed of one or more drive line portions 301 that can be electrically connected by drive line links 303 at connections 305. Drive line links 303 are not electrically connected to sense lines 223; rather, the drive line links can bypass the sense lines through bypasses 307. Drive lines 222 and sense lines 223 can interact capacitively to form touch pixels such as touch pixels 226 and 227. Drive lines 222 (i.e., drive line segments 301 and corresponding drive line links 303) and sense lines 223 can be formed of electrical circuit elements in touch screen 220. In the exemplary configuration of FIG. 3, each of touch pixels 226 and 227 can include a portion of one drive line segment 301, a portion of a sense line 223, and a portion of another drive line segment 301. For example, touch pixel 226 can include a right-half portion 309 of a drive line segment on one side of a portion 311 of a sense line, and a left-half portion 313 of a drive line segment on the opposite side of portion 311 of the sense line. The circuit elements can include, for example, elements that can exist in conventional LCD displays, as described above. It is noted that circuit elements are not limited to whole circuit components, such a whole capacitor, a whole transistor, etc., but can include portions of circuitry, such as only one of the two plates of a parallel plate capacitor. FIG. 4 illustrates an exemplary configuration in which common electrodes (Vcom) can form portions of the touch sensing circuitry of a touch sensing system. Each display pixel includes a common electrode 401, which is a circuit element of the display system circuitry in the pixel stackup (i.e., the stacked material layers forming the display pixels) of the display pixels of some types of conventional LCD displays, e.g., fringe field switching (FFS) displays, that can operate as part of the display system to display an image.

In the example shown in FIG. 4, each common electrode (Vcom) 401 can serve as a multi-function circuit element that can operate as display circuitry of the display system of touch screen 220 and can also operate as touch sensing circuitry of the touch sensing system. In this example, each common electrode 401 can operate as a common electrode of the display circuitry of the touch screen, and can also operate together when grouped with other common electrodes as touch sensing circuitry of the touch screen. For example, a group of common electrodes 401 can operate together as a capacitive part of a drive line or a sense line of the touch sensing circuitry during the touch sensing phase. Other circuit elements of touch screen 220 can form part of the touch sensing circuitry by, for example, electrically connecting together common electrodes 401 of a region, switching electrical connections, etc. In general, each of the touch sensing circuit elements may be either a multi-function circuit element that can form part of the touch sensing circuitry and can perform one or more other functions, such as forming part of the display circuitry, or may be a single-function circuit element that can operate as touch sensing circuitry only. Similarly, each of the display circuit elements may be either a multifunction circuit element that can operate as display circuitry and perform one or more other functions, such as operating as touch sensing circuitry, or may be a single-function circuit element that can operate as display circuitry only. Therefore, in some embodiments, some of the circuit elements in the display pixel stackups can be multi-function circuit elements and other circuit elements may be single-function circuit elements. In other embodiments, all of the circuit elements of the display pixel stackups may be single-function circuit elements.

In addition, although exemplary embodiments herein may describe the display circuitry as operating during a display phase, and describe the touch sensing circuitry as operating during a touch sensing phase, it should be understood that a display phase and a touch sensing phase may be operated at the same time, e.g., partially or completely overlap, or the display phase and touch phase may operate at different times. Also, although exemplary embodiments herein describe certain circuit elements as being multi-function and other circuit elements as being single-function, it should be understood that the circuit elements are not limited to the particular functionality in other embodiments. In other words, a circuit element that is described in one exemplary embodiment herein as a single-function circuit element may be configured as a multi-function circuit element in other embodiments, and vice versa.

For example, FIG. 4 shows common electrodes 401 grouped together to form drive region segments 403 and sense regions 405 that generally correspond to drive line segments 301 and sense lines 223, respectively. Grouping multi-function circuit elements of display pixels into a region can mean operating the multi-function circuit elements of the display pixels together to perform a common function of the region. Grouping into functional regions may be accomplished through one or a combination of approaches, for example, the structural configuration of the system (e.g., physical breaks and bypasses, voltage line configurations), the operational configuration of the system (e.g., switching circuit elements on/off, changing voltage levels and/or signals on voltage lines), etc.

Multi-function circuit elements of display pixels of the touch screen can operate in both the display phase and the touch phase. For example, during a touch phase, common electrodes 401 can be grouped together to form touch signal lines, such as drive regions and sense regions. In some embodiments circuit elements can be grouped to form a continuous touch signal line of one type and a segmented touch signal line of another type. For example, FIG. 4 shows one example embodiment in which drive region segments 403 and sense regions 405 correspond to drive line segments 301 and sense lines 223 of touch screen 220. Other configurations are possible in other embodiments; for example, common electrodes 401 could be grouped together such that drive lines are each formed of a continuous drive region and sense lines are each formed of a plurality of sense region segments linked together through connections that bypass a drive region.

The drive regions in the example of FIG. 3 are shown in FIG. 4 as rectangular regions including a plurality of common electrodes of display pixels, and the sense regions of FIG. 3 are shown in FIG. 4 as rectangular regions including a plurality of common electrodes of display pixels extending the vertical length of the LCD. In some embodiments, a touch pixel of the configuration of FIG. 4 can include, for example, a 64×64 area of display pixels. However, the drive and sense regions are not limited to the shapes, orientations, and positions shown, but can include any suitable configurations according to embodiments of the disclosure. It is to be understood that the display pixels used to form the touch pixels are not limited to those described above, but can be any suitable size or shape to permit touch capabilities according to embodiments of the disclosure.

Figure 5:
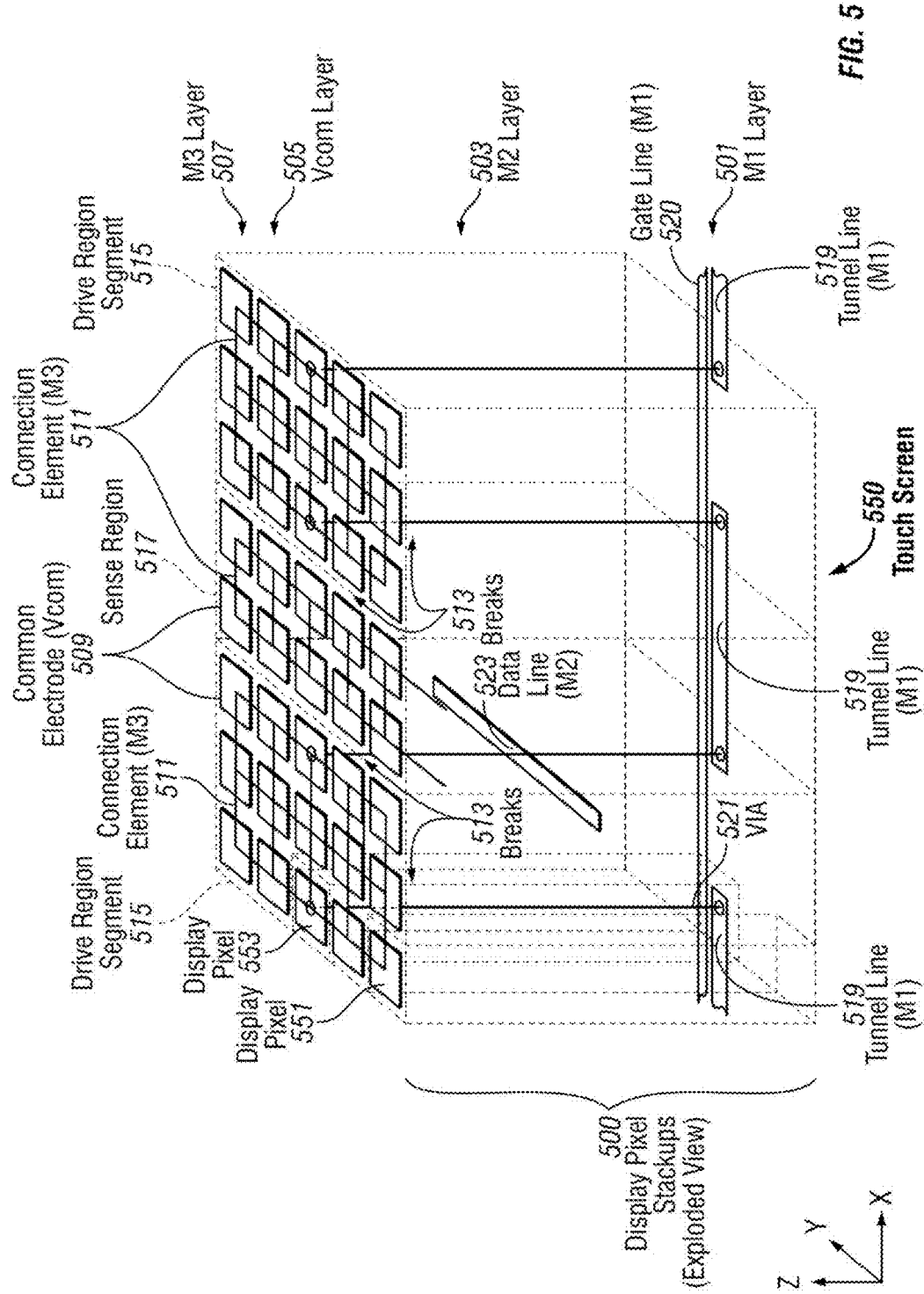
FIG. 5 illustrates an exploded view of exemplary display pixel stackups according to embodiments of the disclosure.

FIG. 5 is a three-dimensional illustration of an exploded view (expanded in the z-direction) of exemplary display pixel stackups 500 showing some of the elements within the pixel stackups of an exemplary integrated touch screen 550. Stackups 500 can include a configuration of conductive lines that can be used to group common electrodes, such as common electrodes 401, into drive region segments and sense regions, such as shown in FIG. 4, and to link drive region segments to form drive lines.

Stackups 500 can include elements in a first metal (M1) layer 501, a second metal (M2) layer 503, a common electrode (Vcom) layer 505, and a third metal (M3) layer 507. Each display pixel can include a common electrode 509, such as common electrodes 401 in FIG. 4, that is formed in Vcom layer 505. M3 layer 507 can include connection element (M3) 511 that can electrically connect common electrodes 509. In some display pixels, breaks 513 can be included in connection element 511 to separate different groups of common electrodes 509 to form drive region segments 515 and a sense region 517, such as drive region segments 403 and sense region 405, respectively. Breaks 513 can include breaks in the x-direction that can separate drive region segments 515 from sense region 517, and breaks in the y-direction that can separate one drive region segment 515 from another drive region segment. M1 layer 501 can include tunnel lines 519 that can electrically connect drive region segments 515 through connections, such as conductive vias 521, which can electrically connect tunnel line 519 to the grouped common electrodes in drive region segment display pixels. Tunnel line 519 can run through the display pixels in sense region 517 with no connections to the grouped common electrodes in the sense region, e.g., no vias 521 in the sense region. The M1 layer can also include gate lines 520. M2 layer 503 can include data lines 523. Only one gate line 520 and one data line 523 are shown for the sake of clarity; however, a touch screen can include a gate line running through each horizontal row of display pixels and multiple data lines running through each vertical row of display pixels, for example, one data line for each red, green, blue (RGB) color sub-pixel in each pixel in a vertical row of an RGB display integrated touch screen.

Structures such as connection elements 511, tunnel lines 519, and conductive vias 521 can operate as a touch sensing circuitry of a touch sensing system to detect touch during a touch sensing phase of the touch screen. Structures such as data lines 523, along with other pixel stackup elements such as transistors, pixel electrodes, common voltage lines, data lines, etc. (not shown), can operate as display circuitry of a display system to display an image on the touch screen during a display phase. Structures such as common electrodes 509 can operate as multifunction circuit elements that can operate as part of both the touch sensing system and the display system.

For example, in operation during a touch sensing phase, gate lines 520 can be held to a fixed voltage while stimulation signals can be transmitted through a row of drive region segments 515 connected by tunnel lines 519 and conductive vias 521 to form electric fields between the stimulated drive region segments and sense region 517 to create touch pixels, such as touch pixel 226 in FIG. 2. In this way, the row of connected drive region segments 515 can operate as a drive line, such as drive line 222, and sense region 517 can operate as a sense line, such as sense line 223. When an object such as a finger approaches or touches a touch pixel, the object can affect the electric fields extending between the drive region segments 515 and the sense region 517, thereby reducing the amount of charge capacitively coupled to the sense region. This reduction in charge can be sensed by a sense channel of a touch sensing controller connected to the touch screen, such as touch controller 206 shown in FIG. 2, and stored in a memory along with similar information of other touch pixels to create an "image" of touch.

Figure 6:
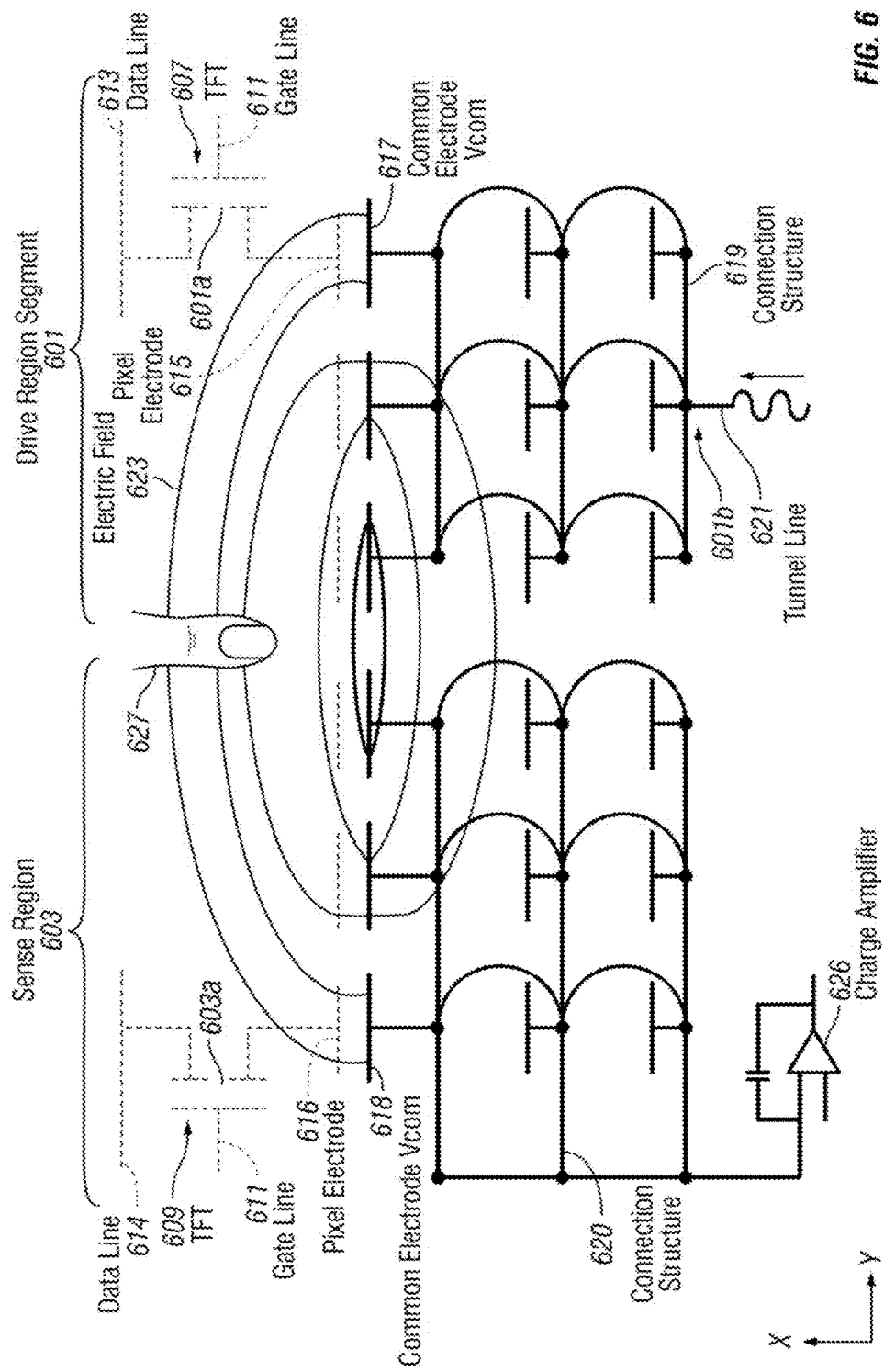
FIG. 6 illustrates an exemplary touch sensing operation according to embodiments of the disclosure.

A touch sensing operation according to embodiments of the disclosure will be described with reference to FIG. 6. FIG. 6 shows partial circuit diagrams of some of the touch sensing circuitry within display pixels in a drive region segment 601 and a sense region 603 of an exemplary touch screen according to embodiments of the disclosure. For the sake of clarity, only one drive region segment is shown. Also for the sake of clarity, FIG. 6 includes circuit elements illustrated with dashed lines to signify that some circuit elements operate primarily as part of the display circuitry and not the touch sensing circuitry. In addition, a touch sensing operation is described primarily in terms of a single display pixel 601a of drive region segment 601 and a single display pixel 603a of sense region 603. However, it is understood that other display pixels in drive region segment 601 can include the same touch sensing circuitry as described below for display pixel 601a, and the other display pixels in sense region 603 can include the same touch sensing circuitry as described below for display pixel 603a. Thus, the description of the operation of display pixel 601a and display pixel 603a can be considered as a description of the operation of drive region segment 601 and sense region 603, respectively.

Referring to FIG. 6, drive region segment 601 includes a plurality of display pixels including display pixel 601a. Display pixel 601a can include a TFT 607, a gate line 611, a data line 613, a pixel electrode 615, and a common electrode 617. FIG. 6 shows common electrode 617 connected to the common electrodes in other display pixels in drive region segment 601 through a connection structure 619 within the display pixels of drive region segment 601 that is used for touch sensing as described in more detail below. Sense region 603 includes a plurality of display pixels including display pixel 603a. Display pixel 603a includes a TFT 609, a data line 614, a pixel electrode 616, and a common electrode 618. TFT 609 can be connected to the same gate line 611 as TFT 607. FIG. 6 shows common electrode 618 connected to the common electrodes in other display pixels in sense region 603 through a connection structure 620 that can be connected, for example, in a border region of the touch screen to form an element within the display pixels of sense region 603 that is used for touch sensing as described in more detail below.

During a touch sensing phase, gate line 611 can be connected to a power supply, such as a charge pump, that can apply a voltage to maintain TFT 609 in the "off" state. Drive signals can be applied to common electrode 617 through a tunnel line 621 that is electrically connected to a portion of connection element 619 within a display pixel 601b of drive region segment 601. The drive signals, which are transmitted to all common electrodes 617 of the display pixels in drive region segment 601 through connection element 619, can generate an electrical field 623 between the common electrodes of the drive region segment and common electrode 618 of sense region 603, which can be connected to a sense amplifier, such as a charge amplifier 626. The electrical charge can be injected into the structure of connected common electrodes of sense region 603, and charge amplifier 626 converts the injected charge into a voltage that can be measured. The amount of charge injected, and consequently the measured voltage, can depend on the proximity of a touch object, such as a finger 627, to the drive and sense regions. In this way, the measured voltage can provide an indication of touch on or near the touch screen.

Referring again to FIG. 5, it can be seen from FIG. 5 that some display pixels of touch screen 550 include different elements than other display pixels. For example, a display pixel 551 can include a portion of connection element 511 that has breaks 513 in the x-direction and the y-direction, and display pixel 551 does not include tunnel line 519. A display pixel 553 can include a portion of connection element 511 that has a break 513 in the x-direction, but not in the y-direction, and can include a portion of tunnel line 519 and a via 521. Other display pixels can include other differences in the configuration of stackup elements including, for example, no breaks 513 in connection element 511, a portion of tunnel line 519 without a via 521, etc.

The proximity of various circuit elements of integrated touch screens, such as touch screen 550, can result in coupling of signals between different systems of the touch screen. For example, noise that is generated by power systems, such as a gate line system that applies voltage to gate lines of the touch screen during a touch sensing phase, can be coupled into the touch sensing system, which can potentially corrupt touch sensing signals.

Figure 7:
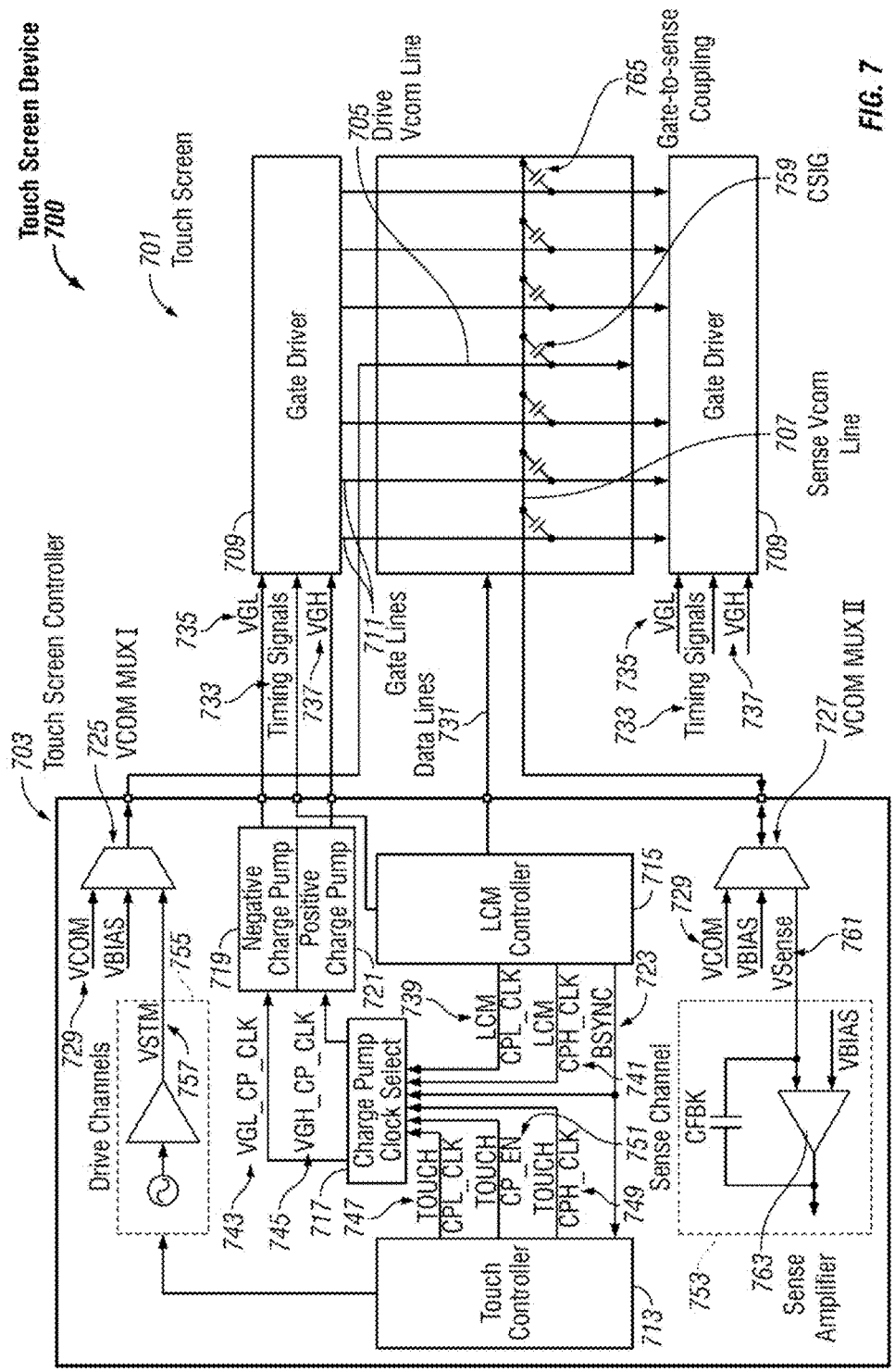
FIG. 7 illustrates an exemplary touch screen device according to various embodiments.
Figure 8:
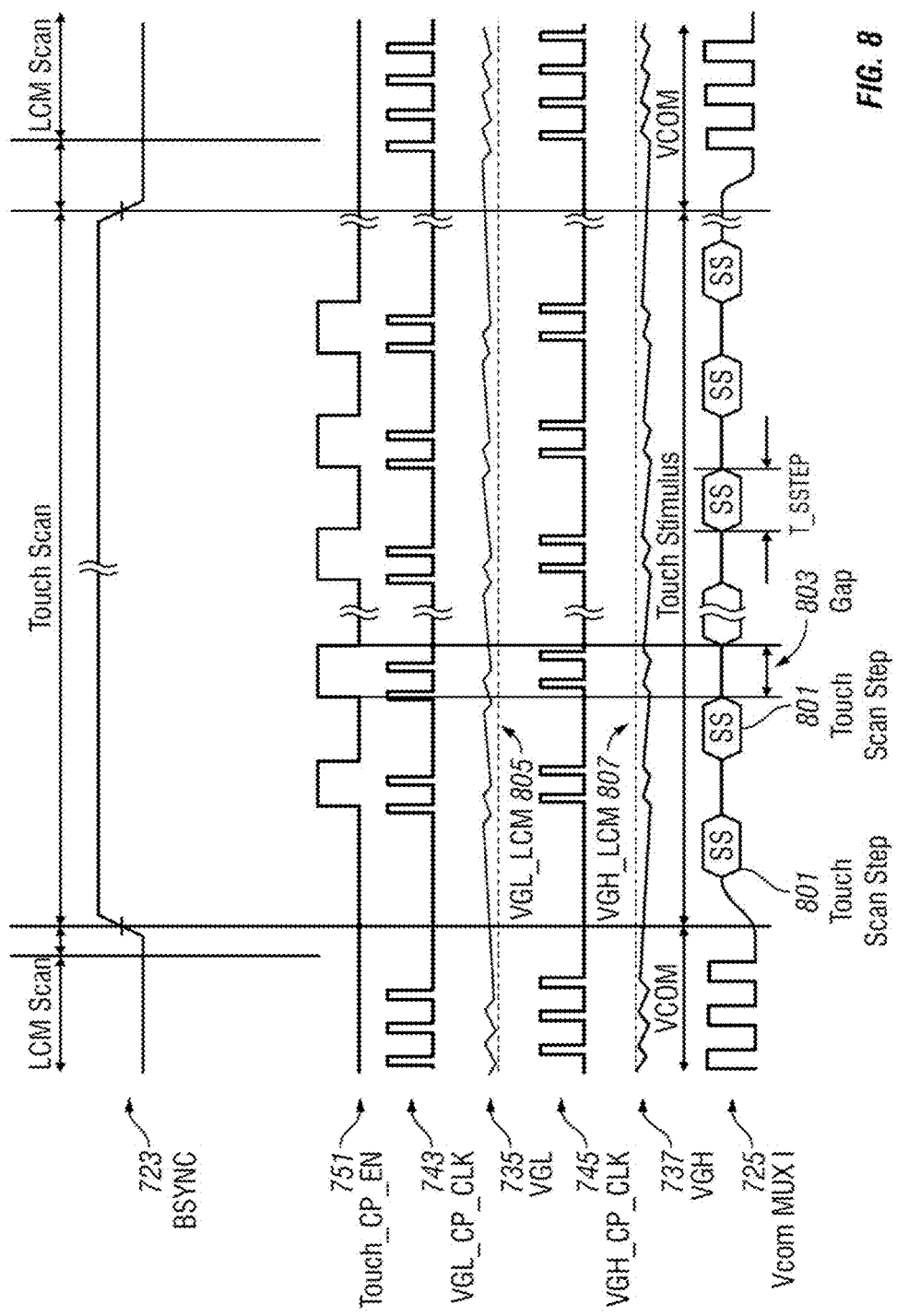
FIG. 8 presents a timing diagram for an exemplary power-management technique for a touch sensing system according to various embodiments.

FIGS. 7 and 8 illustrate an exemplary touch screen device 700 and an exemplary power management method, respectively, that can reduce or eliminate the effect of power system noise on a touch sensing system according to various embodiments. FIG. 7 illustrates a touch screen device 700, which can include a touch screen 701 and a touch screen controller 703. Touch screen 701 can be an integrated touch screen, such as touch screen 550, in which the common electrodes can operate as a common voltage source during a display phase and can operate as drive lines and sense lines during a touch sensing phase. For the sake of clarity, only one drive Vcom line 705 and one sense Vcom line 707 are illustrated in the figure. Touch screen 701 can also include gate drivers 709 and gate lines 711.

Touch screen controller 703 can be a combined touch and display controller, and can include both a touch controller 713, which can control the touch sensing operation of touch screen 701, and a display controller, such as LCM controller 715, which can control the display operation of the touch screen. In this regard, some of the components of touch screen controller 703 can be shared between LCM controller 715 and touch controller 713. For example, a charge pump system, including a charge pump clock selector 717, a negative charge pump 719, and a positive charge pump 721, can be used during both the display and touch phases, as described in more detail below. A synchronization signal (BSYNC) 723 between LCM controller 715 and touch controller 713 can be used to synchronize the display and touch sensing operations. For example, the display phase can correspond to a low BSYNC 723 signal, and the touch phase can correspond to a high BSYNC 723 signal.

During the display phase, a first Vcom multiplexer (VCOM MUX I) 725 and a second Vcom multiplexer (VCOM MUX II) 727 can connect the common electrodes (not shown) of touch screen 701 to a Vcom voltage source (not shown) controlled by LCM controller 715, thus allowing LCM controller 715 to apply a Vcom voltage (VCOM) 729 to the common electrodes. LCM controller 715 can update the image displayed on touch screen 701 by applying data voltages to data lines 731 while scanning gate lines 711. LCM controller 715 can scan the gate lines using timing signals 733 to control gate drivers 709, and charge pump clock selector 717 can select the LCM controller to control negative charge pump 719 and positive charge pump 721 to apply a VGL 735 (low gate voltage) and a VGH 737 (high gate voltage) to gate lines 711 through gate drivers 709. Specifically, charge pump clock selector 717 can select signals LCM_CPL_CLK 739 and LCM_CPH_CLK 741 from LCM controller 715 as negative charge pump clock signal (VGL_CP_CLK) 743 and positive charge pump clock signal (VGH_CP_CLK) 745, respectively, to control negative charge pump 719 and positive charge pump 721. For the sake of clarity, a single charge pump system is shown in FIG. 7, although it is to be understood that a second charge pump system can be used to apply voltages to additional gate drivers 709 on an opposite side of touch screen 701, such that some gate lines 711 can be driven from one side of the touch screen and other gate lines 711 can be driven from the other side of the touch screen. In some embodiments, a positive and negative inductive boost regulator can be used instead of the positive and negative charge pump. In either exemplary configuration, subsequent voltage regulators, such as low dropout regulators (LDOs), can be used to stabilize the VGL 735 and/or VGH 737 rails. In this exemplary embodiment, the pixel TFTs (not shown) can be switched off with VGL 735 (e.g., −10 V) and switched on with VGH 737 (e.g., +10 V). However, one skilled in the art would understand that different voltage levels can be used depending on, for example, the particular type of transistor used for the pixel TFT.

During the touch sensing phase, the charge pump system can be used by touch controller 713. Specifically, charge pump clock selector 717 can select signals TOUCH_CPL_CLK 747 and TOUCH_CPH_CLK 749 from touch controller 713 as negative charge pump clock signal (VGL_CP_CLK) 743 and positive charge pump clock signal (VGH_CP_CLK) 745, respectively, to control negative charge pump 719 and positive charge pump 721, to apply VGL 735 and VGH 737 to gate lines 711 through gate drivers 709. In this exemplary embodiment, all of the gate lines can be held at the low gate voltage in order to switch off all of the pixel TFTs during the touch sensing phase. In other words, VGL 735 can be applied to all of the gate lines during the touch sensing phase in the present exemplary embodiment.

Touch controller 713 can also send a signal TOUCH_CP_EN 751 to charge pump clock selector 717 to select whether the charge pumps are enabled or disabled, as described in more detail below.

VCOM MUX II 727 can connect the common electrodes associated with each sense Vcom line 707 to a corresponding sense channel 753. Touch controller 713 can scan the drive Vcom lines 705 by controlling VCOM MUX I 725 to connect the common electrodes associated with the drive Vcom lines to drive channels 755 in a particular scanning order while applying drive signals (VSTM) 757 to drive Vcom lines 705. Each drive signal 757 can be coupled to a sense Vcom line 707 through a signal capacitance (CSIG) 759 that can vary depending on the proximity of a touch object, such as a finger, resulting in a sense signal on the sense Vcom line. Touch controller 713 can receive sense signals (VSENSE) 761 from sense Vcom lines 707 through sense channels 753. Each sense channel 753 can include a sense amplifier 763 that amplifies sense signals 761. The amplified sense signals can be further processed by touch controller 713 to determine touches on touch screen 701.

However, applying VGL 735 to gate lines 711 can introduce noise into sense signals 761. For example, a parasitic gate-to-sense coupling 765 can exist between each gate line 711 and each sense Vcom line 707. Noise, such as voltage ripples, in VGL 735 can be coupled into sense Vcom lines 707 through gate-to-sense couplings 765. If the noise occurs while drive signals 757 are being applied and sense signals 761 are being received, the noise can be coupled into the sense signals and amplified by sense amplifier 763, possibly corrupting touch sensing results.

FIG. 8 illustrates an exemplary power management timing method during the touch sensing phase of touch screen device 700 according to various embodiments. FIG. 8 shows an exemplary timing of BSYNC 723, TOUCH_CP_EN 751, VGL_CP_CLK 743, VGL 735, VGH_CP_CLK 745, and VGH 737. FIG. 8 also illustrates the output of VCOM MUX I 725, which can be drive signals 757 during the touch sensing phase. In particular, touch screen 701 can be scanned using multiple touch scan steps 801 in a single touch sensing phase, with one or more drive signals 757 being applied during each touch scan step. During each touch scan step, touch controller 713 can set TOUCH_CP_EN 751 to a low state, such that negative charge pump 719 and positive charge pump 721 are disabled. In other words, the charge pumps can be shut off during active touch sensing, which can help eliminate one source of noise in sense signals 761, such as voltage ripples in the charge pumps that might have otherwise been coupled into the sense signals.

In between touch scan steps 801, touch controller 713 can suspend the application of drive signals 757, i.e., suspend active touch sensing, and can set TOUCH_CP_EN 751 to a high state to enable the charge pump clocks and therefore allow the charge pumps to restore VGL 735 and VGH 737 voltage levels, which may have drooped toward ground during touch scanning. It should be understood that the charge pump voltages can still be supplied even during touch scanning. Setting TOUCH_CP_EN 751 to a high state can allow the charge pumps to switch and restore the VGL/VGH voltage levels. In this way, for example, the voltage on gate lines 711 can be maintained at an acceptable level throughout the touch sensing phase by activating the charge pumps during the gaps 803 in between touch scan steps 801 to correct any drops in the voltages on gate lines 711 that may occur while the charge pumps are disabled during the touch scan steps.

In this regard, during each gap 803 in between touch scan steps 801, touch controller 713 can control the negative and/or positive charge pumps, as needed, to apply voltage to the gate lines to maintain desired gate line voltage levels. In the example illustrated in FIG. 8, two clock transitions can occur on signal VGL_CP_CLK 743 to the negative charge pump 719 to restore the VGL 735 voltage level that is applied to the gate driver. Likewise, two clock transitions can occur on signal VGH_CP_CLK 745 to restore VGH 737 voltage levels to the gate driver. The number of clock transitions on VGL_CP_CLK 743 and VGH_CP_CLK 745 can be, for example, a function of the load current drawn from VGL 735 and VGH 737. The voltage levels of VGL 735 and VGH 737 illustrated in FIG. 8 show how the voltage levels can be affected by periodically clocking negative charge pump 719 and positive charge pump 721, respectively. Referring to the VGL level, for example, at times when clock transitions on VGL_CP_CLK 743 are not occurring, the voltage level of VGL 735 can droop toward ground and away from the desired voltage level due to, for example, load current imposed on VGL 735 by the gate driver. In some embodiments, touch controller 713 can boost the gate voltages such that the voltage levels of VGL 735 and VGH 737 that are applied during the touch sensing phase are lower than the corresponding voltage magnitudes applied during the display phase.

When negative charge pump 719 is clocked by VGL_CP_CLK 743, the level of VGL 735 and, therefore, the voltage on gate lines can be restored to the VGL_LCM 805 voltage level. Likewise, when positive charge pump 721 is clocked by VGH_CP_CLK 745, the level of VGH 737 can be restored to the VGH_LCM 807 voltage level. In some cases, noise generated by negative charge pump 719 can affect touch sensing, such as by causing disturbance on the output of the sense amplifier. These disturbances can continue after the charge pump is disabled due to, for example, the finite settling time of the sense amplifier. In some embodiments, post-noise stabilizing can be applied to reduce or eliminate disturbances. For example, sense amplifier disturbances can be reduced or eliminated by shorting the sense amplifier's feedback network to reset the sense amplifier.

Figure 9B:
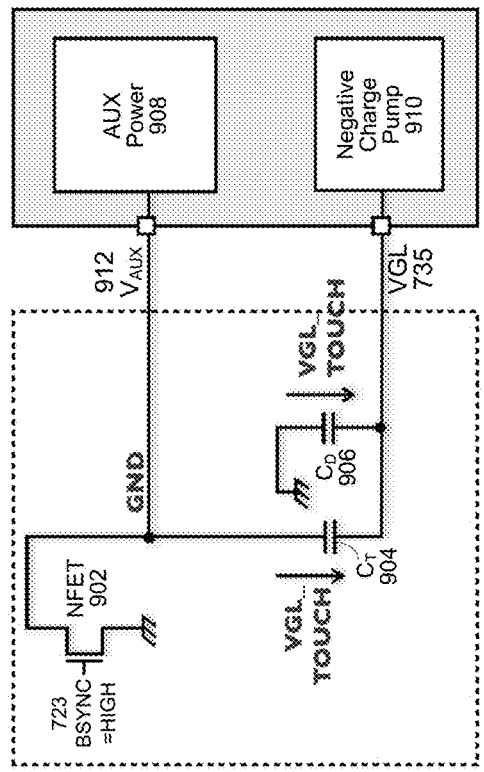
FIGS. 9A-9B illustrate how power is switched through different capacitors according to embodiments of the disclosure.
Figure 9A:
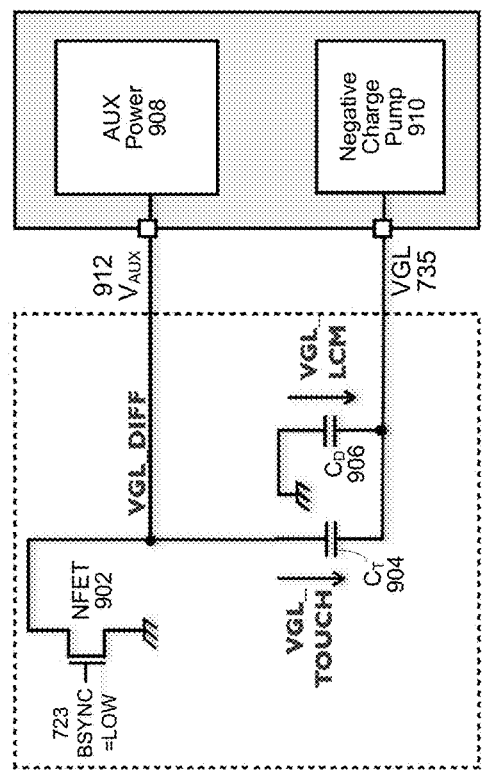

FIGS. 9A-9B illustrate how power is switched through different capacitors according to embodiments of the disclosure. More specifically, FIGS. 9A and 9B provide details about how the voltage VGL 735 in FIG. 7 is generated. Note that similar circuitry (not shown) is used to generate the high voltage level VGH 737 in FIG. 7. The circuitry illustrated in FIGS. 9A and 9B includes a display capacitor $C_D$ 906 and a touch capacitor $C_T$ 904. In the embodiment illustrated in FIGS. 9A and 9B, $C_D$ 906 is permanently coupled between VGL 735 and ground. In contrast, $C_T$ 904 has a first terminal coupled to VGL 735 and a second terminal coupled to $V_{AUX}$ 912 which is powered by an auxiliary power supply 908. The second terminal of $C_T$ 904 is also coupled through NFET 902 to ground, and the gate of NFET 902 is coupled to BSYNC signal 723.

The circuitry illustrated in FIGS. 9A and 9B generally operates as follows. During the display mode (illustrated in FIG. 9A), negative charge pump 910 drives VGL 735 to the display mode voltage VGL_LCM. At the same time, BSYNC signal 723 goes low which causes NFET 902 to decouple the second terminal of $C_T$ 904 from ground. During display mode, AUX power 908 charges $C_T$ 904 to VGL_DIFF, wherein VGL_DIFF is a voltage difference between the display-mode voltage VGL_LCM and the touch-mode voltage VGL_TOUCH. Because the first terminal of $C_T$ 904 is driven to VGL_LCM during the display mode, this causes the voltage difference between the first and second terminals of $C_T$ 904 to be set to VGL_TOUCH.

During the touch mode (illustrated in FIG. 9B), BSYNC signal 723 goes high which causes NFET 902 to couple the second terminal of $C_T$ 904 to ground. At the same time, the output of AUX power 908 is tri-stated. Because $C_T$ 904 was previously charged to VGL_TOUCH, this causes VGL 735 to rapidly transition to VGL_TOUCH. During touch mode, negative charge pump 910 maintains VGL 735 at VGL_TOUCH.

Figure 10:
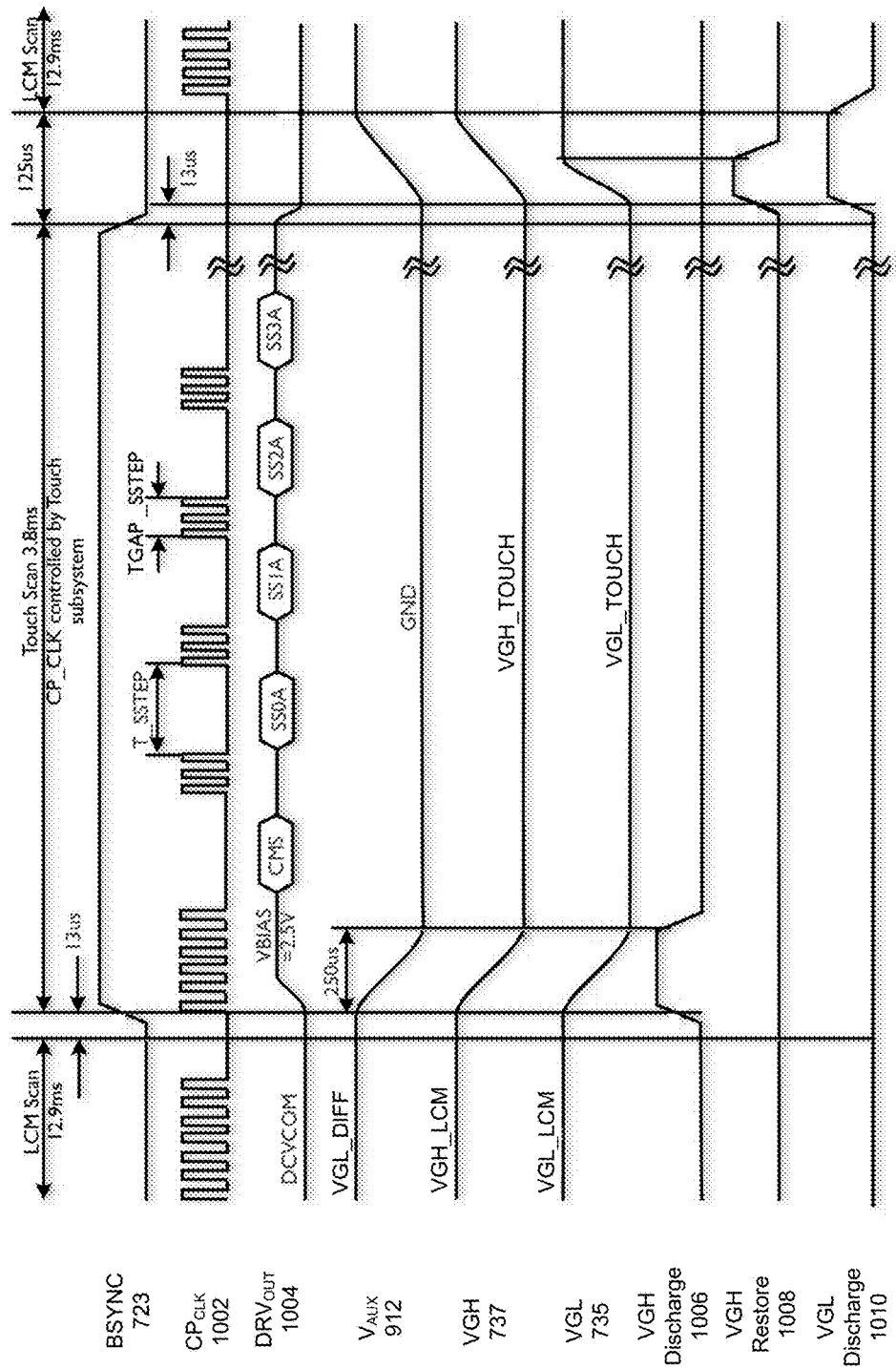
FIG. 10 presents a timing diagram illustrating how power is switched between different capacitors according to embodiments of the disclosure.

FIG. 10 presents a timing diagram illustrating how power is switched between different voltage levels according to embodiments of the disclosure. More specifically, FIG. 10 illustrates a transition from display mode (labeled as "LCM Scan") to touch mode (labeled as "Touch Scan)" and then back to display mode. Some of the operations involved in these transitions are controlled by the BSYNC signal 723 which is at a low voltage level during the display mode and a high voltage level during the touch mode.

Charge pump clock signal $CP_{CLK}$ 1002 is active during display mode which allows both negative and positive charge pumps to drive the display mode voltages onto power lines VGL 735 and VGH 737. However, during touch mode, $CP_{CLK}$ 1002 is only active during intervals where drive signals are suspended to reduce noise problems. Note that drive signals are controlled by the $DRV_{OUT}$ signal 1004.

$V_{AUX}$ signal 912 starts at the VGL_DIFF voltage level in display mode, wherein VGL_DIFF is the voltage difference between the low display-mode voltage (VGL_LCM) and the low touch-mode voltage (VGL_TOUCH). Next, when the system enters touch mode, NFET 902 causes $V_{AUX}$ 912 to be pulled to ground. Then, at the end of the touch mode, $V_{AUX}$ 912 returns to VGL_DIFF.

The VGH signal 737 is at the VGH_LCM voltage level when the system is in display mode and transitions to VGH_TOUCH when the system enters touch mode. Next, at the end of the touch mode, VGH 737 transitions back to VGH_LCM. Similarly, VGL signal 735 starts in display mode at the VGL_LCM voltage level and transitions to VGL_TOUCH when the system enters touch mode. Next, at the end of the touch mode, VGL 735 transitions back to VGL_LCM.

Note that the VGH discharge signal 1006 is active at the start of touch mode when VGH 737 is transitioning from VGH_LCM to VGH_TOUCH. In contrast, the VGH Restore signal 1008 is active at the start of display mode when VGH 737 is transitioning from VGH_TOUCH to VGH_LCM. Similarly, the VGL discharge signal 1010 is active at the start of display mode when VGL 735 is transitioning from VGL_TOUCH to VGL_LCM.

Figure 11A:
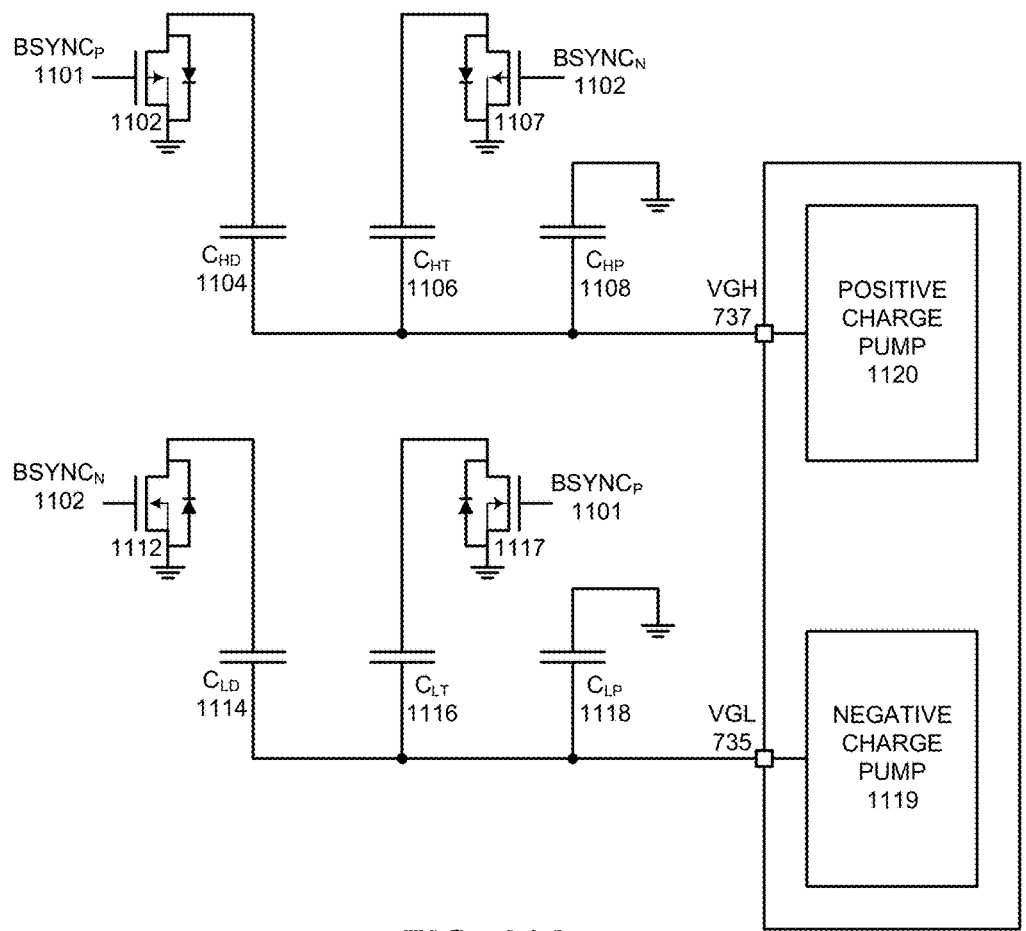
FIG. 11A illustrates an alternative embodiment that alternates switching power through a display capacitor and a touch capacitor according to embodiments of the disclosure.

FIG. 11A illustrates an alternative embodiment that selectively switches a power source output between a display-mode capacitor and a touch-mode capacitor according to embodiments of the disclosure. In this way, neither the display-mode capacitor nor the touch-mode capacitor needs to be continually charged and discharged as the output of the power source cycles between display-mode and touch-mode voltages. During display mode, a charge pump maintains a display-mode voltage across the display-mode capacitor. However, the charge pump does not power the display-mode capacitor during touch mode. Note that the voltage on the display-mode capacitor may slightly deviate from the display-mode voltage during touch mode when the display-mode capacitor is not being powered by the charge pump. However, this voltage deviation is corrected when the display-mode capacitor is subsequently powered by the charge pump when the system returns to display mode. Similarly, the charge pump maintains a touch-mode voltage across a touch-mode capacitor during touch mode, but does not power the touch-mode capacitor during display mode.

Referring to the top of FIG. 11A, a positive charge pump 1120 drives VGH 737, which is coupled through a number of capacitors 1104, 1106 and 1108 to ground. More specifically, VGH 737 is coupled to a first terminal of $C_{HD}$ 1104, wherein $C_{HD}$ 1104 holds the VGH display-mode voltage. The second terminal of $C_{HD}$ 1104 is coupled through PFET 1102 to ground. The gate of PFET 1102 is coupled to the positive BSYNC signal $BSYNC_P$ 1101. In this way, when $BSYNC_P$ 1101 is asserted during display mode, $C_{HD}$ 1104 is coupled between VGH 737 and ground. VGH 737 is also coupled to a first terminal of $C_{HT}$ 1106, wherein $C_{HT}$ 1106 holds the VGH touch-mode voltage. The second terminal of $C_{HT}$ 1106 is coupled through PFET 1107 to ground. Also, the gate of PFET 1107 is coupled to the $BSYNC_N$ 1102, which is the negative BSYNC signal. In this way, when $BSYNC_N$ 1102 is asserted during touch mode, $C_{HT}$ 1106 is coupled between VGH 737 and ground. VGH 737 is also coupled through a parasitic capacitance $C_{HP}$ 1108 to ground, wherein $C_{HP}$ 1108 is associated with various touch panel parasitics.

Referring to the bottom of FIG. 11A, a negative charge pump 1119 drives VGL signal 735, which is coupled through a number of capacitors 1114, 1116 and 1118 to ground. More specifically, VGL 735 is coupled to a first terminal of $C_{LD}$

1114, wherein $C_{LD}$ 1114 holds the VGL display-mode mode voltage. The second terminal of $C_{LD}$ 1114 is coupled through NFET 1112 to ground. The gate of NFET 1112 is coupled to BSYNC$_N$ signal 1102 which is the negative BSYNC signal. In this way, when BSYNC$_N$ signal 1102 is asserted during display mode, $C_{LD}$ 1114 is coupled between VGL 735 and ground. VGL 735 is also coupled to a first terminal of $C_{LT}$ 1116, wherein $C_{LT}$ 1116 holds the touch-mode VGL voltage. The second terminal of $C_{LT}$ 1116 is coupled through NFET 1117 to ground. The gate of NFET 1117 is coupled to the positive BSYNC signal BSYNC$_P$ 1101. In this way, when BSYNC$_P$ 1101 is asserted during touch mode, $C_{LT}$ 1116 is coupled between VGL 735 and ground. Finally, VGL 735 is coupled through a parasitic capacitor $C_{LP}$ 1118 to ground, wherein $C_{LP}$ 1118 is associated with various touch panel parasitics.

Note that the PFET 1102, PFET 1107, NFET 1112, and NFET 1117 illustrated in FIG. 11A include body diodes which facilitate charging of the FETs to initial voltages during system startup.

Figure 11B:
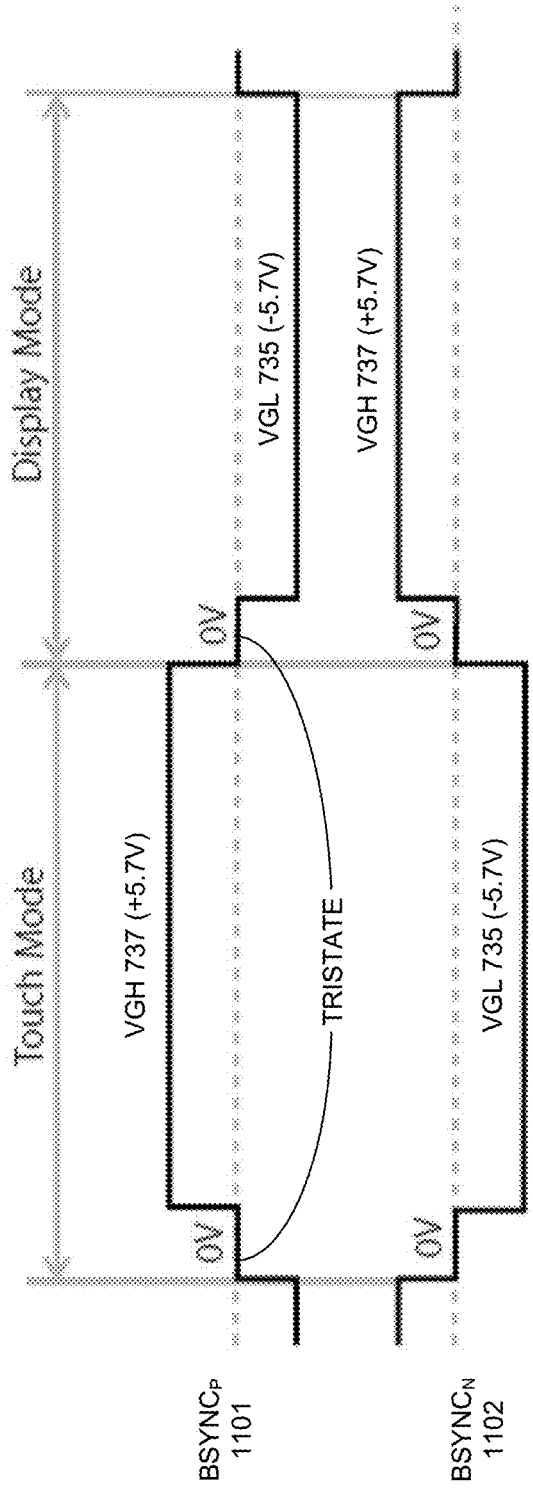
FIG. 11B presents a timing diagram for the embodiment illustrated in FIG. 11A according to embodiments of the disclosure.

FIG. 11B presents a timing diagram for BSYNC$_P$ signal 1101 and BSYNC$_N$ signal 1102 for the circuit illustrated in FIG. 11A according to embodiments of the disclosure. More specifically, FIG. 11B illustrates how the BSYNC$_P$ signal 1101 and BSYNC$_N$ signal 1102 change as the system cycles between touch mode and display mode. At the beginning of the timing diagram, the system is initially in display mode wherein BSYNC$_P$ signal 1101 is at the negative supply voltage −5.7V and BSYNC$_N$ signal 1102 is at the positive supply voltage 5.7V. Next, at the start of touch mode, both BSYNC$_P$ signal 1101 and BSYNC$_N$ signal 1102 briefly enter a tristate period wherein both signals are effectively at zero volts. After this brief tristate period, BSYNC$_P$ signal 1101 rises to the positive supply voltage 5.7V and BSYNC$_N$ signal 1102 falls to the negative supply voltage 1107 −5.7V. Then, at the start of display mode, BSYNC$_P$ signal 1101 and BSYNC$_N$ signal 1102 again briefly enter a tristate period and then BSYNC$_P$ signal 1101 falls to the negative supply voltage −5.7V and BSYNC$_N$ signal 1102 rises to the positive supply voltage 5.7V.

Alternative Embodiments

Figure 12A:
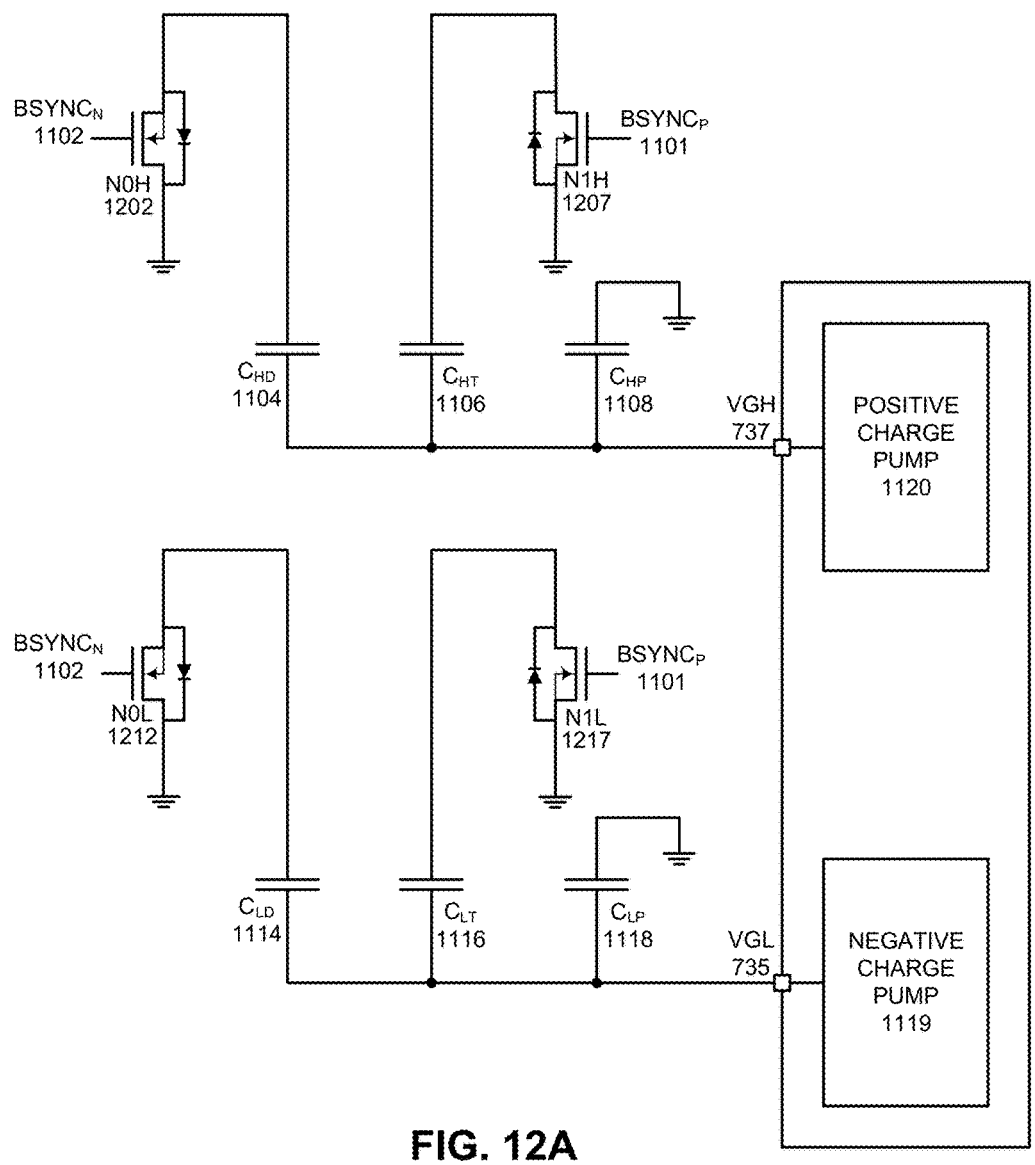
FIG. 12A illustrates a variation of this alternative embodiment that uses NFET transistors according to embodiments of the disclosure.

FIG. 12A illustrates an alternative embodiment that uses NFET transistors according to embodiments of the disclosure. This embodiment is similar to the embodiment illustrated in FIG. 11A, except that PFET transistors 1102 and 1107 are replaced with NFET transistors 1202 and 1207. Also, because of the associated change in transistor polarity, the gate of NFET transistor N0H 1202 is coupled to BSYNC$_N$ signal 1102 and the gate of NFET transistor N1H 1207 is coupled to BSYNC$_P$ signal 1101. Note that FIG. 12A also illustrates the body diodes for the NFET transistors 1202, 1207, 1212 and 1217. These body diodes can be used to precharge the capacitors which are coupled to VGH 737 and VGL 735.

Figure 12B:
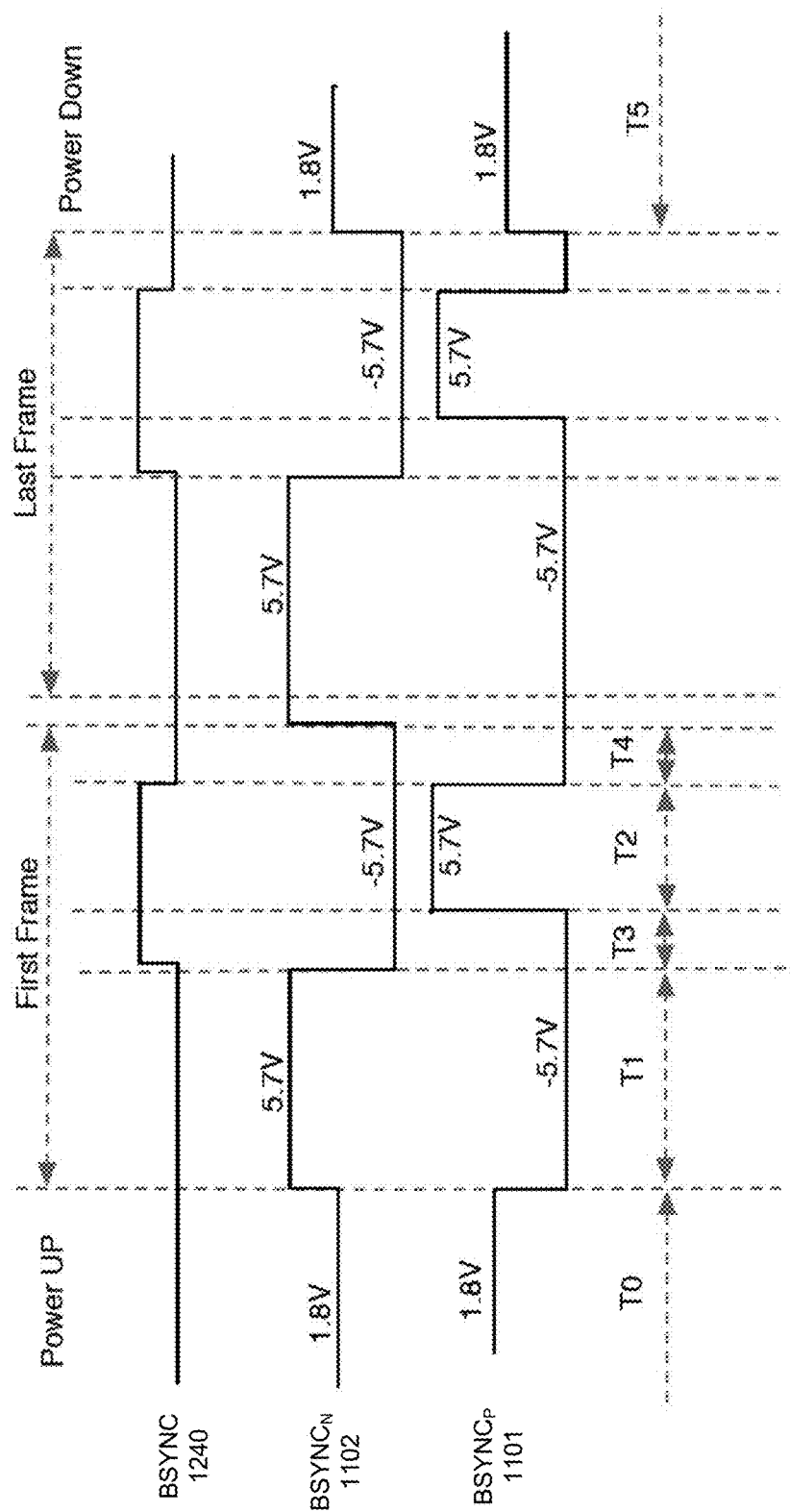
FIG. 12B presents a timing diagram for the embodiment illustrated in FIG. 12A according to embodiments of the disclosure.

FIG. 12B presents a timing diagram for the embodiment illustrated in FIG. 12A according to embodiments of the disclosure. Note that the system provides two supply voltages 1.8V and 5.7V. In the power-up time interval T0, the 1.8V supply is activated first and the 5.7 V supply is not yet available yet. In this situation, the 1.8V supply is used to precharge the capacitors. More specifically, during time interval T0, BSYNC signal 1240 is low and both BSYNC$_N$ signal 1102 and BSYNC$_P$ signal 1101 are at 1.8V. In this case, all of the NFET transistors N0H 1202, N1H 1207, N0L 1212 and N1L 1217 are turned on to precharge capacitors $C_{HD}$ 1104, $C_{HT}$ 1106, $C_{HP}$ 1108, $C_{LD}$ 1114, $C_{LT}$ 1116, and $C_{LP}$ 1118.

Next, at the start of a first frame during time interval T1, BSYNC signal 1240 remains low, BSYNC$_N$ signal 1102 rises to 5.7V and BSYNC$_P$ signal 1101 falls to −5.7V. In this situation, transistors N0H 1202 and N0L 1212 remain on, but transistors N1H 1207 and N1L 1217 are turned off.

Next, during time interval T3, BSYNC signal 1240 goes high, BSYNC$_N$ signal 1102 falls to −5.7V and BSYNC$_P$ signal 1101 remains at −5.7V. In this case, all transistors N0H 1202, N0L 1212, N1H 1207 and N1L 1217 are turned off.

Next, during time interval T2, BSYNC signal 1240 remains high, BSYNC$_N$ signal 1102 remains low at −5.7V and BSYNC$_P$ signal 1101 rises to 5.7V. In this case, transistors N0H 1202 and N0L 1212 are turned off and transistors N1H 1207 and N1L 1217 are turned on.

Then, during time interval T4, BSYNC signal 1240 goes low, BSYNC$_N$ signal 1102 remains at −5.7V and BSYNC$_P$ signal 1101 falls to −5.7V. In this case, transistors N0H 1202 and N0L 1212 remain off and transistors N1H 1207 and N1L 1217 are turned off.

At the end of T4, the system returns to T1 for the next frame. The system then cycles through T1, T3, T2 and T4 for a number of frames. Finally, after the last frame is complete, during the power-down time interval T5, the 5.7V supply turns off first while the 1.8V supply remains on. During this time interval, the 1.8V supply is used to turn the FETs so the capacitors can be discharged. More specifically, BSYNC signal 1240 remains low, and both BSYNC$_N$ signal 1102 and BSYNC$_P$ signal 1101 rise to 1.8V to turn on FETs 1202, 1207, 1212 and 1217.

Figure 13A:
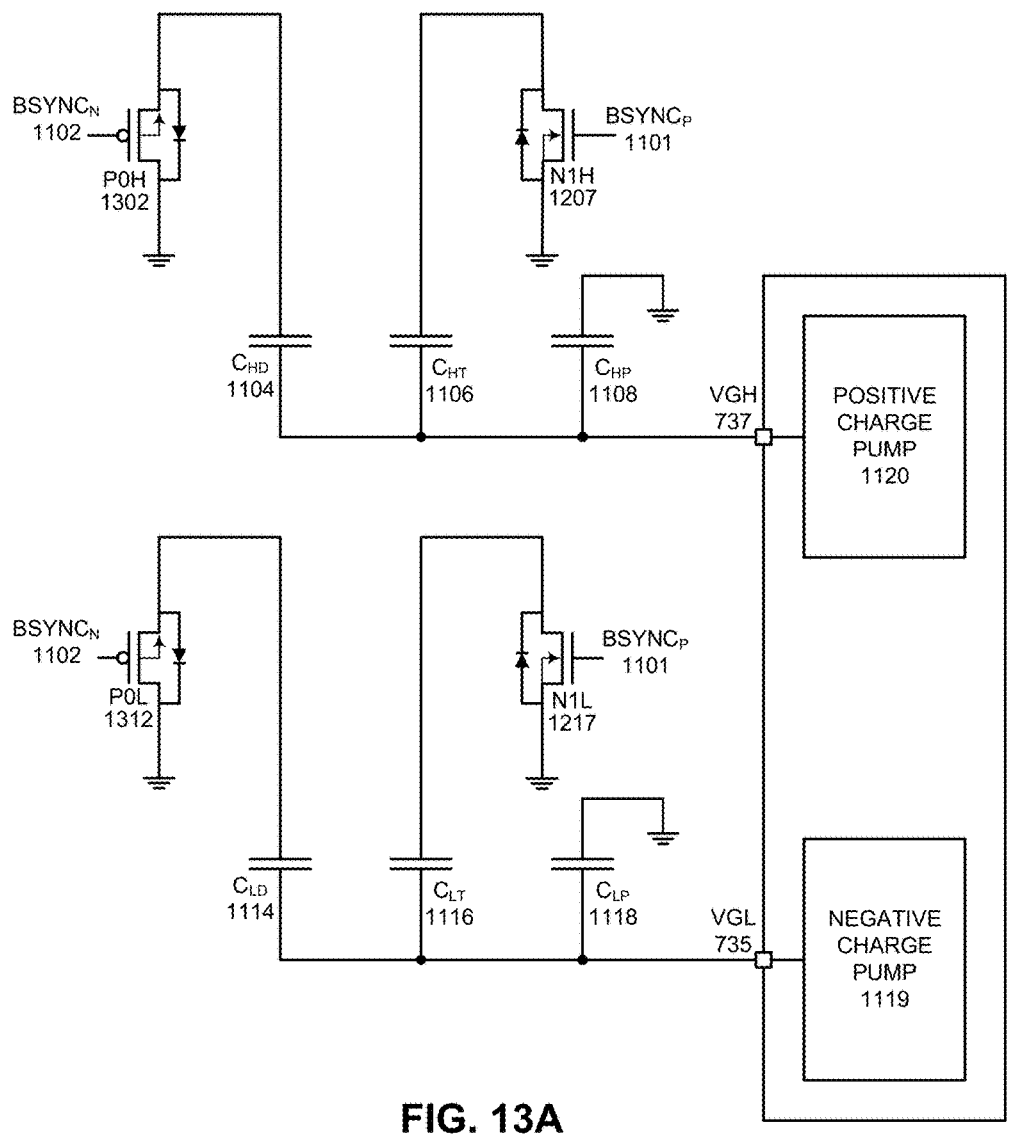
FIG. 13A illustrates a variation of this alternative embodiment that uses NFET and PFET transistors according to embodiments of the disclosure.
Figure 13B:
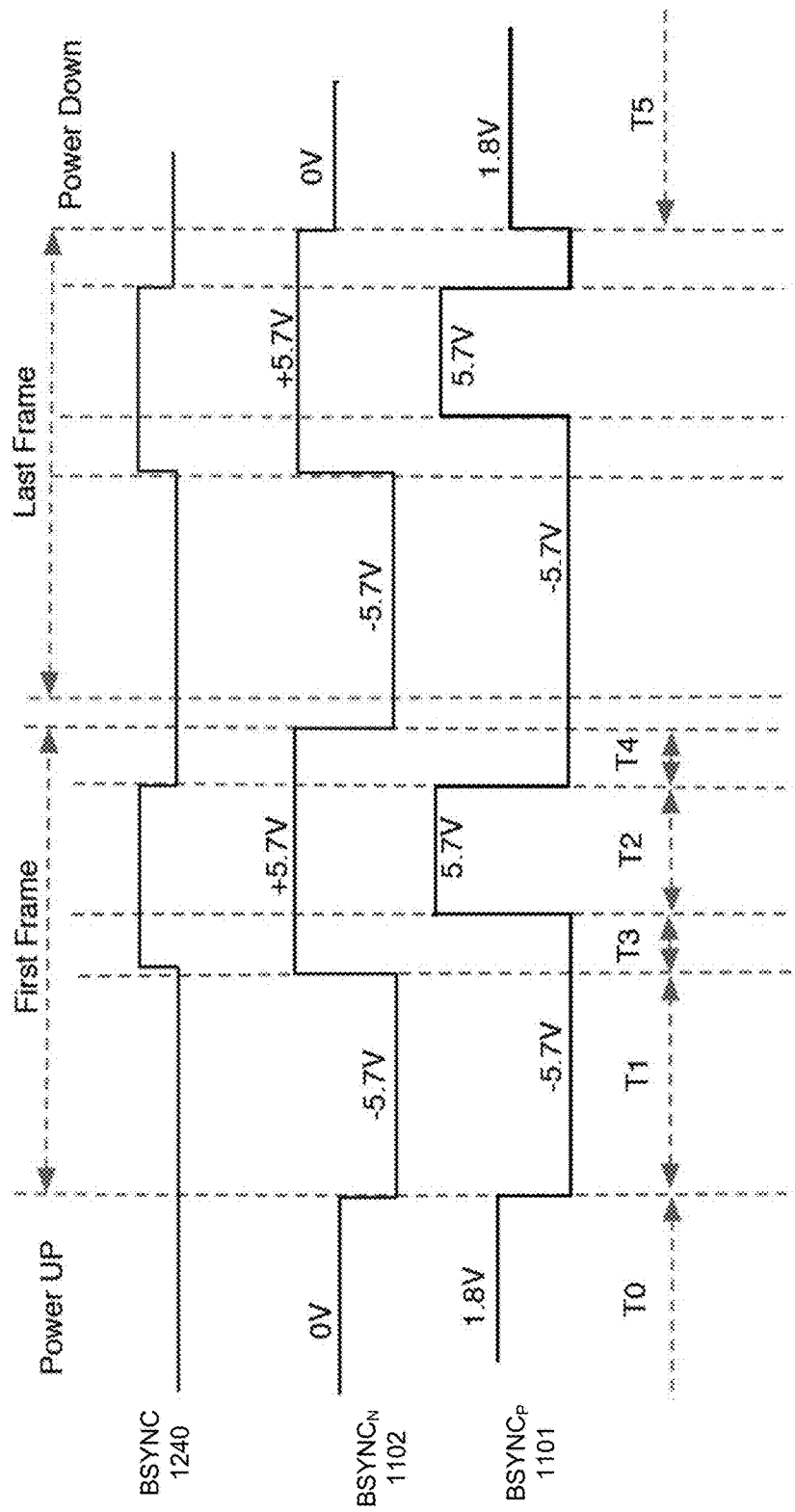
FIG. 13B presents a timing diagram for the embodiment illustrated in FIG. 13A according to embodiments of the disclosure.

FIG. 13A illustrates a variation of this alternative embodiment that uses NFET and PFET transistors according to embodiments of the disclosure. This embodiment is similar to the embodiment illustrated in FIG. 12A, except that NFET transistors 1202 and 1207 have been replaced with PFET transistors 1202 and 1207. FIG. 13B presents a timing diagram for the embodiment illustrated in FIG. 13A according to embodiments of the disclosure. This timing diagram is similar to the timing diagram illustrated in FIG. 12B, except that the voltage levels for BSYNC$_N$ signal 1102 are essentially reversed to perform the same functional operations. More specifically, BSYNC$_N$ signal 1102 starts out at 0V in T0, falls to −5.7V in T1, rises to 5.7V in T3, remains at 5.7V in both T2 and T4 and then returns to 0V in T5.

Figure 14A:
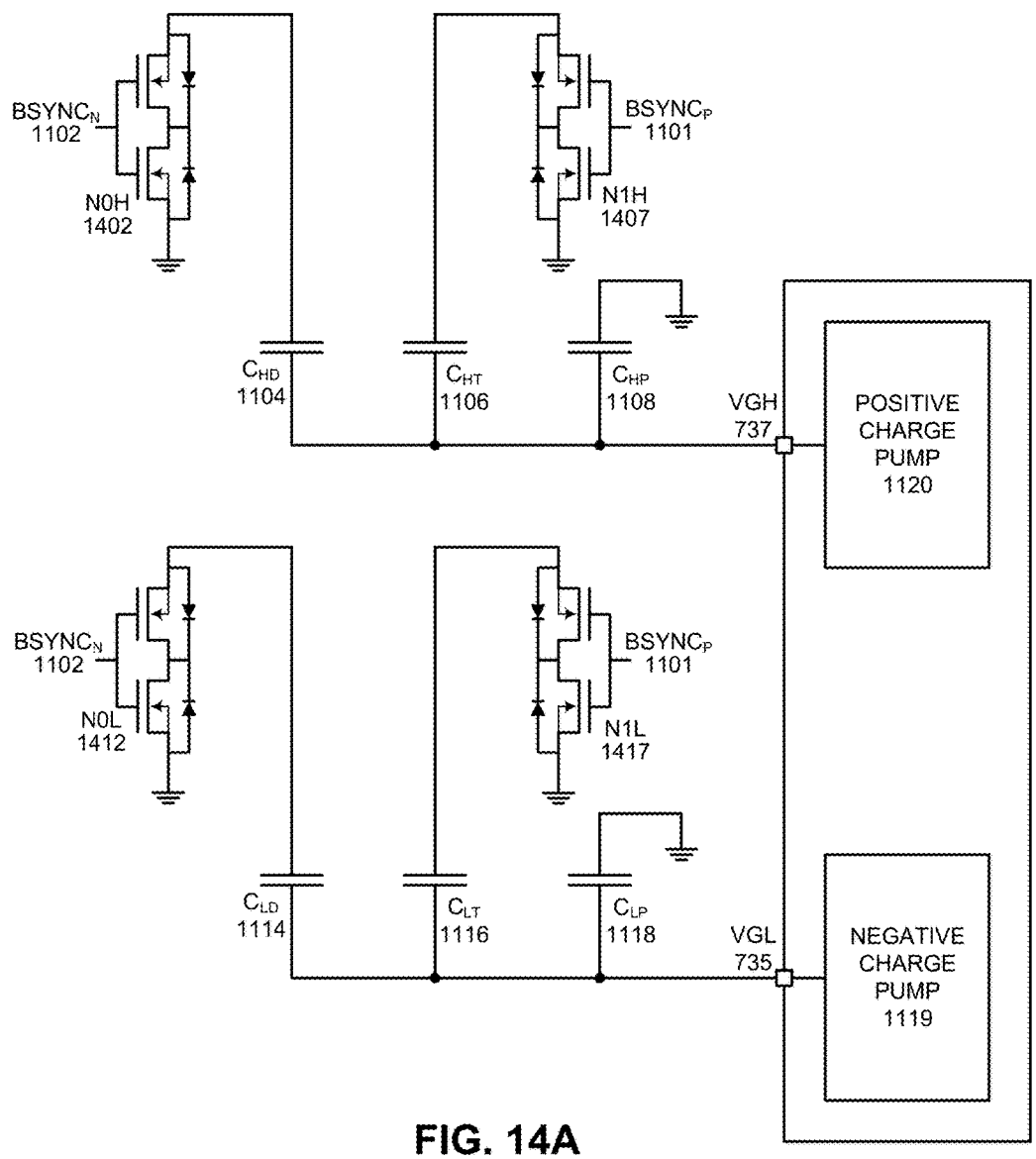
FIG. 14A illustrates a variation of this alternative embodiment that uses NFET transistors without body diode conduction according to embodiments of the disclosure.

FIG. 14A illustrates another embodiment that uses NFET transistors without body diode conduction according to embodiments of the disclosure. In this case, each FET 1402, 1407, 1412 and 1417 is actually 2 FETs connected in series, with body diodes connected back-to-back, to eliminate substrate diode conduction and to avoid any coupling to VGH 737 or VGL 735, which can potentially cause voltage errors in the capacitors.

In this embodiment, the FETs are all in a defined state prior to the 5.7V supply, VGH and VGL being active (startup condition), without having to rely on the FET body diodes to pre-charge the VGH and VGL capacitors 1104, 1106, 1108, 1114, 116 and 1118. Note that the 1.8V supply is typically applied prior to 5.7V supply because it powers the touch/display logic. In order to put the FETs 1402, 1407, 1412 and 1417 in a defined state, BSYNC$_N$ signal 1102 and BSYNC$_P$ signal 1101 can be driven from the 1.8V domain to turn on the FETs to allow pre-charging of the VGL/VGH capacitors.

Figure 14B:
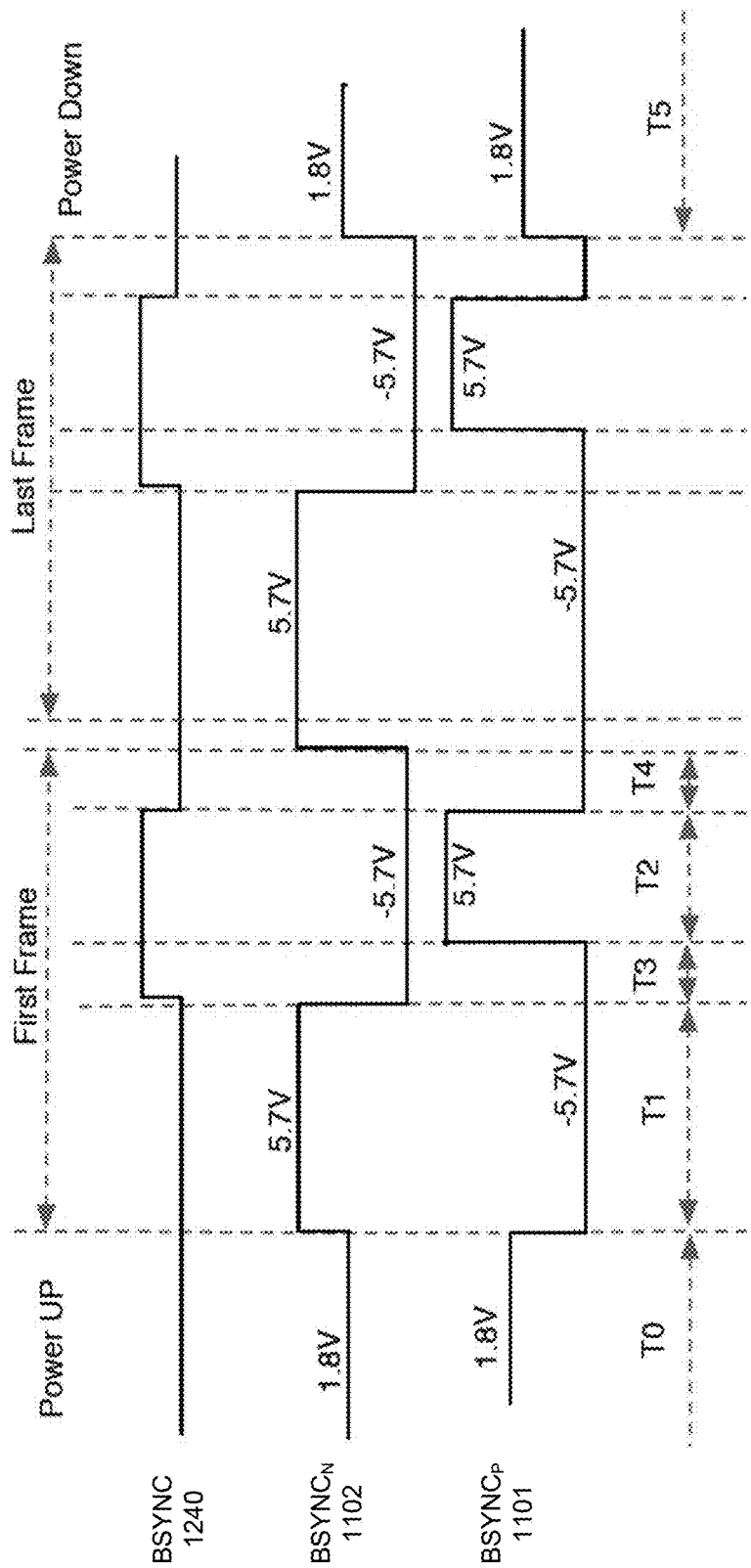
FIG. 14B presents a timing diagram for the embodiment illustrated in FIG. 14A according to embodiments of the disclosure.

FIG. 14B presents a timing diagram for the embodiment illustrated in FIG. 14A according to embodiments of the disclosure. Note that this timing diagram is essentially the same as the timing diagram illustrated in FIG. 12B.

The foregoing descriptions of embodiments have been presented for purposes of illustration and description only. They are not intended to be exhaustive or to limit the present description to the forms disclosed. Accordingly, many modifications and variations will be apparent to practitioners skilled in the art. Additionally, the above disclosure is not intended to limit the present description. The scope of the present description is defined by the appended claims.

What is claimed is:

1. A method for providing power for a touch-enabled display, comprising:
    during a display mode, driving a display-mode voltage through a power output, wherein the power output is coupled to:
        a display-mode capacitor $C_D$, and
        a touch-mode capacitor $C_T$; and
    during a transition from the display mode to a touch mode, causing a change in:
        a voltage at a first terminal of the touch-mode capacitor $C_T$,
        a voltage at a second terminal of the touch-mode capacitor $C_T$,
        a voltage at at least one terminal of the display-mode capacitor $C_D$, and
        a voltage at the power output.

2. The method of claim 1, wherein:
    during the display mode, the power output is uncoupled, through the touch-mode capacitor $C_T$, from ground, and
    during the touch mode, the power output is coupled, through the touch-mode capacitor $C_T$, to the ground.

3. The method of claim 1, further comprising:
    during the touch mode, driving a touch-mode voltage through the power output.

4. The method of claim 1, further comprising:
    during the touch mode, coupling the touch-mode capacitor $C_T$ in parallel with the display-mode capacitor $C_D$ between the power output and ground;
    wherein a capacitance of the touch-mode capacitor $C_T$ is larger than a capacitance of the display-mode capacitor $C_D$, and the touch-mode capacitor $C_T$ dominates the display-mode capacitor $C_D$ during the touch mode.

5. The method of claim 1, further comprising, during the transition from the display mode to the touch mode, uncoupling the display-mode capacitor $C_D$ from ground.

6. The method of claim 1,
    wherein the power output is a low output, the low output providing a low display-mode voltage during the display mode and providing a low touch-mode voltage during the touch mode; and
    wherein a second power output is associated with a high output, the high output providing a high display-mode voltage during the display mode and providing a high touch-mode voltage during the touch mode.

7. The method of claim 1, wherein during the display mode, the display-mode capacitor $C_D$ is charged to a first voltage, the display-mode voltage being based on the first voltage, and the touch-mode capacitor $C_T$ is charged to a second voltage, different than the first voltage.

8. The method of claim 7, wherein during the transition from the display mode to the touch mode, the display-mode capacitor $C_D$ remains charged to the first voltage and the touch-mode capacitor $C_T$ remains charged to the second voltage.

9. The method of claim 1, wherein:
    during the display mode, the display-mode capacitor $C_D$ is electrically coupled between the power output and a first node, and the touch-mode capacitor $C_T$ is electrically coupled between the power output and a second node, different than the first node, and
    during the touch mode, the display-mode capacitor $C_D$ is electrically coupled between the power output and the first node, and the touch-mode capacitor $C_T$ is electrically coupled between the power output and the first node and the second node.

10. The method of claim 9, wherein the first node is ground, and the second node is a power source.

11. The method of claim 1, wherein:
    during the display mode, one terminal of the touch-mode capacitor $C_T$, opposite a terminal of the touch-mode capacitor $C_T$ coupled to the power output, is coupled to a first voltage, and
    the voltage changes at the first and second terminals of the touch-mode capacitor $C_T$, the at least one terminal of the display-mode capacitor $C_D$, and the power output result from coupling the one terminal of the touch-mode capacitor $C_T$ to a second voltage, different than the first voltage.

12. An apparatus that provides power for a touch-enabled display, comprising:
    a display-mode capacitor $C_D$ coupled to a power output;
    a touch-mode capacitor $C_T$ coupled to the power output; and
    a controller for the touch-enabled display configured to:
        cycle between a display mode and a touch mode;
        provide power to the touch-enabled display through the power output; and
        during a transition from the display mode to the touch mode, causing a change in:
            a voltage at a first terminal of the touch-mode capacitor $C_T$,
            a voltage at a second terminal of the touch-mode capacitor $C_T$,
            a voltage at at least one terminal of the display-mode capacitor $C_D$, and
            a voltage at the power output.

13. The apparatus of claim 12, wherein the controller is configured to:
    during the display mode, uncouple the power output, through the touch-mode capacitor $C_T$, from ground, and
    during the touch mode, couple the power output, through the touch-mode capacitor $C_T$, to the ground.

14. The apparatus of claim 12, wherein the controller is configured to, during the touch mode, drive a touch-mode voltage through the power output.

15. The apparatus of claim 12, wherein the controller is configured to, during the touch mode, couple the touch-mode capacitor $C_T$ in parallel with the display-mode capacitor $C_D$ between the power output and ground;
    wherein a capacitance of the touch-mode capacitor $C_T$ is larger than a capacitance of the display-mode capacitor $C_D$, and the touch-mode capacitor $C_T$ dominates the display-mode capacitor $C_D$ during the touch mode.

16. The apparatus of claim 12,
    wherein the power output is a low output, the low output providing a low display-mode voltage during the display mode and providing a low touch-mode voltage during the touch mode; and
    wherein a second power output is associated with a high output, the high output providing a high display-mode voltage during the display mode and providing a high touch-mode voltage during the touch mode.

17. The apparatus of claim 12, wherein the controller is configured to:

during the display mode, couple the display-mode capacitor $C_D$ between the power output and a first node and the touch-mode capacitor $C_T$ between the power output and a second node, different than the first node, and
during the touch mode, couple display-mode capacitor $C_D$ between the power output and the first node and the touch-mode capacitor $C_T$ between the power output and the first node and the second node.

18. The apparatus of claim 17, wherein the first node is ground, and the second node is a power source.

19. The apparatus of claim 12, wherein the controller is configured to:
during the display mode:
charge the display-mode capacitor $C_D$ to a first voltage, the display-mode voltage being based on the first voltage, and
charge the touch-mode capacitor $C_T$ is charged to a second voltage, different than the first voltage.

20. The apparatus of claim 12, wherein the controller is configured to, during the display mode, couple one terminal of the touch-mode capacitor $C_T$, opposite a terminal of the touch-mode capacitor $C_T$ coupled to the power output, to a first voltage, and
wherein the voltage changes at the first and second terminals of the touch-mode capacitor $C_T$, the at least one terminal of the display-mode capacitor $C_D$, and the power output result from coupling the one terminal of the touch-mode capacitor $C_T$ to a second voltage, different than the first voltage.

21. The apparatus of claim 12, wherein during the transition from the display mode to the touch mode, the display-mode capacitor $C_D$ remains charged to the first voltage and the touch-mode capacitor $C_T$ remains charged to the second voltage.

22. A touch-enabled display, comprising:
a touch screen comprising a plurality of display pixels;
a display system that updates the display pixels during a display mode;
a touch sensing system that senses touches on the touch screen during a touch mode;
a display-mode capacitor $C_D$ coupled to a power output;
a touch-mode capacitor $C_T$ coupled to the power output; and
a controller for the touch-enabled display, the controller configured to:
cycle between the display mode and the touch mode;
provide power to the touch-enabled display through the power output; and
during a transition from the display mode to the touch mode, cause a change in:
a voltage at a first terminal of the touch-mode capacitor $C_T$,
a voltage at a second terminal of the touch-mode capacitor $C_T$,
a voltage at at least one terminal of the display-mode capacitor $C_D$, and
a voltage at the power output.

23. The touch-enabled display of claim 22, wherein the controller is configured to:
during the display mode, uncouple the power output, through the touch-mode capacitor $C_T$, from ground, and
during the touch mode, couple the power output, through the touch-mode capacitor $C_T$, to the ground.

24. The touch-enabled display of claim 22, wherein the controller is configured to, during the touch mode, drive a touch-mode voltage through the power output.

25. The touch-enabled display of claim 22, wherein the controller is configured to:
during the touch mode, couple the touch-mode capacitor $C_T$ in parallel with the display-mode capacitor $C_D$ between the power output and ground;
wherein a capacitance of the touch-mode capacitor $C_T$ is larger than a capacitance of the display-mode capacitor $C_D$, and the touch-mode capacitor $C_T$ dominates the display-mode capacitor $C_D$ during the touch mode.

26. The touch-enabled display of claim 22, wherein the power output is a low output, the low output providing a low display-mode voltage during the display mode and providing a low touch-mode voltage during the touch mode; and
wherein a second power output is associated with a high output, the high output providing a high display-mode voltage during the display mode and providing a high touch-mode voltage during the touch mode.

27. The touch-enabled display of claim 22, wherein during the display mode, the display-mode capacitor $C_D$ is charged to a first voltage, the display-mode voltage being based on the first voltage, and the touch-mode capacitor $C_T$ is charged to a second voltage, different than the first voltage.

28. The touch-enabled display of claim 22, wherein:
during the display mode, the display-mode capacitor $C_D$ is electrically coupled between the power output and a first node, and the touch-mode capacitor $C_T$ is electrically coupled between the power output and a second node, different than the first node, and
during the touch mode, the display-mode capacitor $C_D$ is electrically coupled between the power output and the first node, and the touch-mode capacitor $C_T$ is electrically coupled between the power output and the first node and the second node.

29. The touch-enabled display of claim 22, wherein:
during the display mode, one terminal of the touch-mode capacitor $C_T$, opposite a terminal of the touch-mode capacitor $C_T$ coupled to the power output, is coupled to a first voltage, and
the voltage changes at the first and second terminals of the touch-mode capacitor $C_T$, the at least one terminal of the display-mode capacitor $C_D$, and the power output result from coupling the one terminal of the touch-mode capacitor $C_T$ to a second voltage, different than the first voltage.

30. The touch-enabled display of claim 22, wherein the first node is ground, and the second node is a power source.

31. The touch-enabled display of claim 22, wherein during the transition from the display mode to the touch mode, the display-mode capacitor $C_D$ remains charged to the first voltage and the touch-mode capacitor $C_T$ remains charged to the second voltage.

32. A non-transitory computer readable storage medium containing instructions that, when executed by a processor of an electronic device, cause the processor to perform a method for providing power for a touch-enabled display, the method comprising:
during a display mode, drive a display-mode voltage through a power output, wherein the power output is coupled to:
a display-mode capacitor $C_D$, and
a touch-mode capacitor $C_T$; and
during a transition from the display mode to a touch mode, cause a change in:
a voltage at a first terminal of the touch-mode capacitor $C_T$, a voltage at a second terminal of the touch-mode capacitor $C_T$,
a voltage at at least one terminal of the display-mode capacitor $C_D$, and a voltage at the power output.

* * * * *